United States Patent
Szita et al.

(10) Patent No.: US 6,771,443 B2
(45) Date of Patent: Aug. 3, 2004

(54) CIRCUMFERENTIAL POSITIONING OF SERVO SECTORS FOR SERVO TRACK WRITING

(75) Inventors: Gabor Szita, Newark, CA (US); Lawrence Matthias Bryant, Palo Alto, CA (US); Karl Arnold Belser, San Jose, CA (US); Alan Fennema, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 448 days.

(21) Appl. No.: 09/917,065

(22) Filed: Jul. 26, 2001

(65) Prior Publication Data

US 2002/0145817 A1 Oct. 10, 2002

Related U.S. Application Data

(60) Provisional application No. 60/270,325, filed on Feb. 19, 2001.

(51) Int. Cl.[7] ............................ G11B 5/09; G11B 25/04; G11B 21/02
(52) U.S. Cl. ........................................... 360/51; 360/75
(58) Field of Search ...................................... 360/51, 75

(56) References Cited

U.S. PATENT DOCUMENTS

| | | | |
|---|---|---|---|
| 5,164,866 A | 11/1992 | Sano et al. | 360/77.08 |
| 5,448,429 A * | 9/1995 | Cribbs et al. | 360/75 |
| 5,535,067 A | 7/1996 | Rooke | 360/51 |
| 5,581,420 A | 12/1996 | Chainer et al. | 360/75 |
| 5,757,574 A | 5/1998 | Chainer et al. | 360/75 |
| 5,901,003 A | 5/1999 | Chainer et al. | 360/51 |
| 6,040,955 A | 3/2000 | Brown et al. | 360/75 |
| 6,064,541 A | 5/2000 | Sasamoto et al. | 360/77.05 |
| 6,633,451 B1 * | 10/2003 | Chainer et al. | 360/75 |

* cited by examiner

Primary Examiner—David Hudspeth
Assistant Examiner—Dan I. Davidson
(74) Attorney, Agent, or Firm—Fellers, Snider, et al.

(57) ABSTRACT

A propagating method is provided in which timing and servo sector information is propagated throughout a data storage media that initially contains only a guide pattern. The method uses an offset between the write element and the read element in a read/write head to position and propagate the timing information. In addition, a method for circumferentially aligning timing and servo sector information is disclosed that utilizes a time delay to position the propagated timing and servo sector information. Another method for attenuating timing errors during timing and servo sector propagation to a data storage media is disclosed. Timing errors are attenuated through the use of phase locked loop circuit and measurement of the phase error detected between different tracks on the data storage media. Apparatuses implementing the methods including a storage device readable by a computer system that implements the methods are provided.

25 Claims, 14 Drawing Sheets

CIRCUMFERENTIAL POSITIONING OF SERVO SECTORS FOR SERVO TRACK WRITING

RELATED APPLICATIONS

This application claims priority of U.S. provisional application Serial No. 60/270,325, filed Feb. 19, 2001.

FIELD OF THE INVENTION

This application relates generally to disc drive data storage devices and more particularly to an apparatus and method of writing servo track and timing information thereon.

BACKGROUND OF THE INVENTION

Disc drives are the most common means of storing electronic information in use today. Ordinary disc drives are typically constructed with the following internal components: one or more magnetic media discs attached to a spindle; a spindle motor that rotates the spindle and the attached discs at a constant high speed; an actuator assembly, located adjacent to the discs, with a plurality of actuator arms that extend over the discs, each with one or more flexures extending from the end of each actuator arm, and with a read/write head mounted at the distal end of each flexure; and a servo positioner that rotates the actuator assembly about a bearing shaft assembly positioned adjacent to the discs such that the read/write heads radially traverse the disc surface (i.e., move back and forth the between the inner and outer diameters of the disc).

Information is stored on and retrieved from a magnetizable material on the disc's surface. To facilitate information storage and retrieval, discs are radially divided in concentric circles known as "servo tracks" or "tracks". The tracks are assigned a track number so that the servo positioner can locate a specific track. The servo positioner, upon receiving a control command, aligns the read/write head over the desired track. The process of switching between different tracks is called "seeking", whereas remaining over a single track while information is stored or retrieved is called "following".

Each track is subdivided into pie-shaped sections, called "segments" or "sectors". There may be ten to a hundred, or even more, sectors dispersed around a single track. Each sector usually has one or more servo sectors (also known as servo marks among others) associated with it. A servo sector contains information that is used by the servo positioner to determine the radial position of the head relative to the disc surface and relative to the track center. Servo sectors typically consist of a Gray code field, which provides coarse position information such as the track and cylinder number, and a servo burst field, which provides fine position information such as the relative position of the read/write head to the track center. Generally speaking, the servo burst field creates a signal with a specific voltage magnitude when the read element is not aligned over the track centerline. The signal is decoded to pinpoint the read element's location and the read element is moved directly over the centerline by positioning the read element such that the sum of the servo burst field voltages equals zero.

Whereas servo sectors are used to determine the radial position of the read/write head relative to the disc surface, the servo positioner uses a timing signal mechanism to determine the circumferential position of the read/write head relative to the disc surface. A timing, or clock, burst (also commonly referred to as a timing or clock, mark, pulse, or signal among others) consisting of a series of magnetic transitions of a constant frequency is used as a timing signal mechanism by most servo positioners. In a typical disc drive, timing bursts are written at various circumferential locations around each track. Usually each segment of the track contains a timing burst. For simplicity, the magnetic transitions of the timing burst, depending on their phase, will be referred to as "even" or "odd" transitions.

The servo positioner can use the timing bursts in conjunction with an index signal to determine the circumferential location of the read/write head relative to the disc surface. The index signal, usually obtained from a spindle motor driver, goes active at a predetermined spindle motor position in each disc revolution. In most disc drives, the spindle motor rotates the discs at a constant velocity and the circumferential location of the read/write head relative to the disc surface can easily be determined by measuring the time interval between the index signal and a timing burst.

Tracks, servo sectors, and timing bursts are usually written on the disc during the manufacturing process, using one of two means: 1) a servowriting machine, or 2) self-propagated servo writing. A servowriting machine is a large piece of external equipment that uses a very accurate lead screw and laser displacement measurement feedback device to precisely align a write element. The write element, which is attached to an external head/arm positioner, is aligned relative to where the desired track is to be written on the disc surface. A track is written on the disc once the write element is correctly aligned. An external clock signal is then used to write the servo sectors and timing pulses onto the track. The head/arm positioner then moves the write element a predetermined distance to the next desired track location. The next track, along with corresponding servo sectors and timing bursts, is written. The process repeats until the desired number of tracks is written onto the disc.

A servowriter, however, has several drawbacks. First, a typical disc may contain more than 60,000 servo tracks. The process of aligning and writing each track with its corresponding servo sectors and timing bursts is very time consuming and expensive. Second, although very accurate at lower track densities, the servowriter cannot meet the accuracy requirements dictated at higher track densities. Finally, the servowriter procedure must be completed in a clean room because the disc components are exposed during servowriting; again adding expense to the servowriting procedure.

The second means of writing tracks on a disc is called self-propagating servo writing. Oliver et al. first described this method of servo track writing in U.S. Pat. No. 4,414,589. Several other patents have disclosed slight variations in the Oliver patent, but the same basic approach is used. Under the basic method, the drive's actuator arm is positioned at one of its travel range limit stops. A first reference track is written with the write element. The first reference track is then read with the read element as the read/write head is radially displaced from the first reference track. When a distance is reached such that the read element senses a predetermined percentage of the first reference track's amplitude, a second reference track is written. The predetermined percentage is called the "reduction number".

For example, the read element senses 100% of the first reference track's amplitude when the read element is directly over the first reference track. If the reduction number is 40%, the read/write head is radially displaced from the first reference track until the read element senses only 40% of the first reference track's amplitude. A second reference pattern is written to the disc once the 40% is sensed by the read element. The read/write head is then displaced in the same direction until the read element senses 40% of the second reference track's amplitude. A third reference track is then written and the process continues. The process ends when the actuator arm's second limit stop is reached and the entire disc surface is filled with reference tracks. The average track density is then calculated using the number of tracks written and the length of travel of the read/write head.

If the average track density is too high, the disc is erased, the reduction number is lowered so that a larger displacement occurs between tracks, and the process is repeated. If the track density is too low, the disc is erased, the reduction number is increased so that a smaller displacement occurs between tracks, and the process is repeated. If the track density is within the desired range, the reduction number for the desired average track density has been determined, the disc is erased, and servo tracks are written to the disc by alternatively writing servo and reference tracks. Each track is then further divided by writing servo sectors and timing bursts around the track's circumference.

Although Oliver et al. did not disclose a method of propagating timing marks within servo tracks, Chanier et al. (U.S. Pat. Nos. 5,581,420, 5,901,003, and 5,757,574) disclosed several methods for propagating timing marks. The methods disclosed by Chanier et al., however, are not applicable to disc drives in which the radial offset, between the read/write head's read element and write element, is larger than the width of the write element and/or the width of the read element.

A new method of self-propagating servo track writing called Extended Copying with Head Offset, or ECHO, introduced by Seagate Technology LLC uses a radial offset between the read and write elements, which is greater than the width of the write element and/or the width of the read element to write servo tracks on the disc surface. The ECHO process utilizes the offset between the read and write element such that as the write element is writing a new servo track, the read element is gathering positional information from a previously written servo track. In other words, the write element's position over the desired track location is maintained as the read element follows a previously written track. The radial offset, between the read element and the write element, is several tracks wide in some embodiments of the ECHO process. Therefore, Chanier's methods for propagating timing bursts cannot be used with ECHO process.

Accordingly there is a need for a method of writing timing bursts on disc drives that can be used for disc drives in which the offset between the read element and the write element is greater than the width of the write element.

SUMMARY OF THE INVENTION

Against this backdrop an embodiment of the present invention has been developed. The embodiment proposes a timing burst writing technique for use with conventional servowriting and self-propagating servo track writing, including the ECHO process. In one embodiment, a servo track guide pattern containing servo sectors and timing bursts are written onto the surface of a disc using a conventional servowriter. The timing information consists of a series of "odd" and "even" bursts. By convention, the first, third, fifth, etc. timing bursts following a servo sector are referred to as "odd bursts", while the second, fourth, sixth, etc. timing bursts following a servo sector are referred to as "even bursts." Each burst consists of a series of magnetic transitions. The write element is aligned over the servo track to have timing bursts written. The read element, offset from the write element, remains aligned over the servo track guide pattern. The phased-lock-loop ("PLL") controller is synchronized to the even timing bursts when the read element traverses an even timing burst. When the write element traverses an area where an odd burst is to be written, the controller enables the write element and a series of magnetic transitions constituting an odd burst is propagated (i.e., written) onto the disc surface. After the odd burst is written to the track, the PLL is synchronized to the odd burst as the read element is activated. When the write element traverses an area where an even burst is to be written, the write element is enabled and a series of magnetic transition constituting an even burst is propagated onto the disc surface. When all the desired timing bursts are written on a track, the head is displaced until the write element is aligned over the next track to have timing bursts written. The process of synchronization, writing, and displacing is repeated until all of the desired tracks contain timing bursts.

These and various other features as well as advantages which characterize the present invention will be apparent from a reading of the following detailed description and a review of the associated drawings.

DETAILED DESCRIPTION

Figure 1:
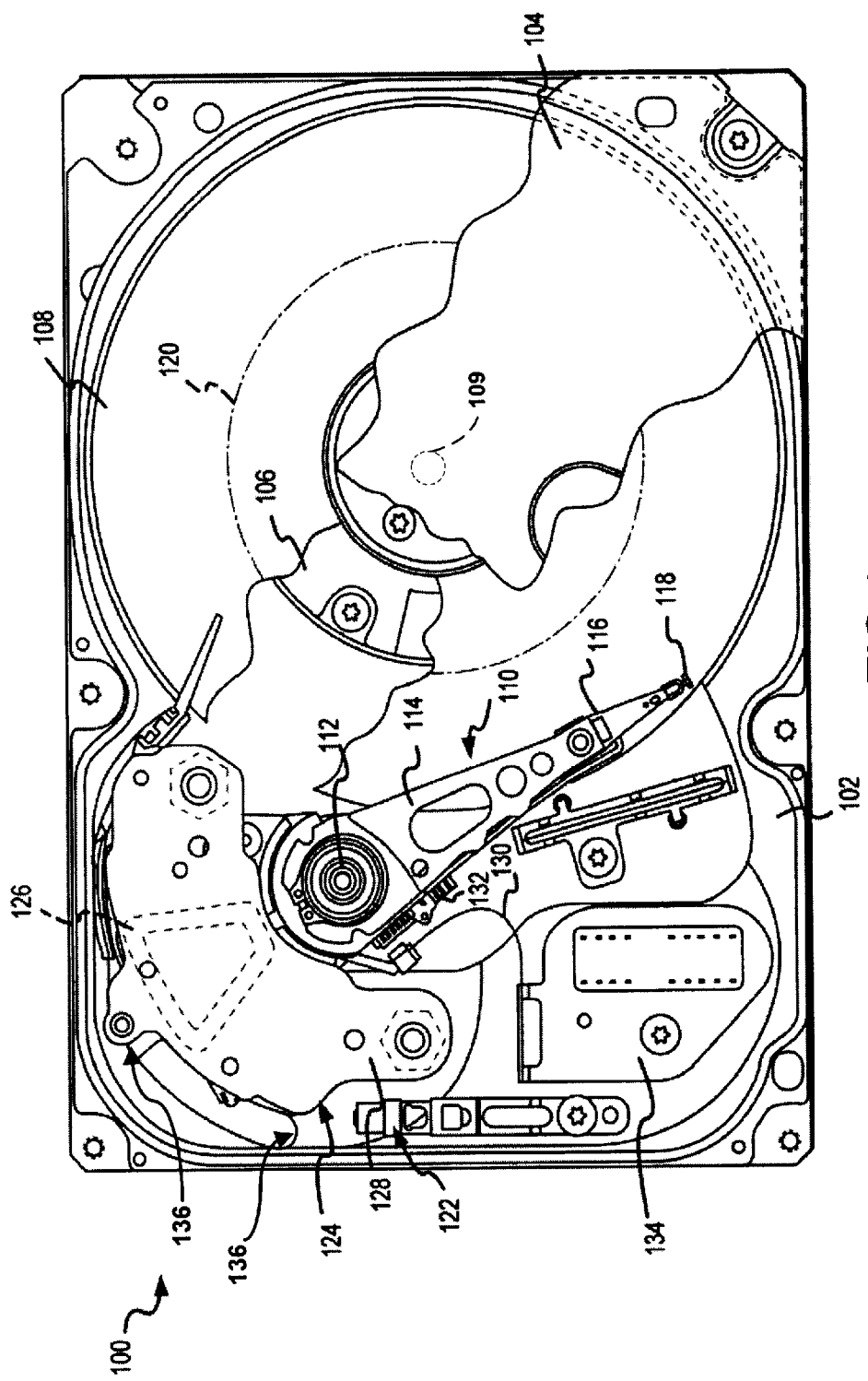
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 106, which rotates one or more magnetic media discs 108 at a constant high speed about a disc center 109. A magnetic media disc 108 is used to illustrate a preferred embodiment of the present invention, but the present invention may be implemented using other types of data storage discs. Information is written to and read from tracks 120 on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer head 118 (also know as a read/write head), which includes an air bearing slider enabling the transducer head 118 to fly in close proximity above the corresponding surface of the associated disc 108. The read/write head 118 bas a read element (not shown, also know as a read transducer or read head) for retrieving information from the disc 108 and a write element (not shown, also know as a write transducer or write head) for storing information to the disc 108.

During a seek operation, the track 120 position of the transducer heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the transducer heads 118 are caused to move over the surfaces of the discs 108. The range of motion of the actuator assembly 110 is limited by travel-limit-stops 136 such that the transducer head 118 remains over the surface of the disc 108.

The spindle motor 106 is typically de-energized when the disc drive 100 is not in use for extended periods of time. The transducer heads 118 are moved over park zones near the inner diameter of the discs 108 when the spindle motor 106 is de-energized. The transducer heads 118 are secured over the park zones through the use of an actuator latch arrangement 122, which prevents inadvertent rotation of the actuator assembly 110 when the transducer heads 118 are parked.

A flex assembly 130 provides the requisite electrical connection paths for the actuator assembly 110 while allowing pivotal movement of the actuator assembly 110 during operation. The flex assembly 130 includes a preamplifier 132 to which transducer head wires (not shown) are connected; the head wires being routed along the actuator arms 114 and the flexures 116 to the transducer heads 118. The preamplifier 132 amplifies read signals generated by the transducer heads 118 during a read operation. The flex assembly 130 terminates at a flex bracket 134 for communication through the base deck 102 to a disc drive printed circuit board (not shown) mounted to the bottom side of the disc drive 100. The printed circuit board may contain electronic circuits such as a servo controller circuit, a spindle motor controller circuit, a phase-locked-loop circuit, a write head amplifier circuit, a time interval analyzer circuit, and a timing controller circuit among others.

Figure 2:
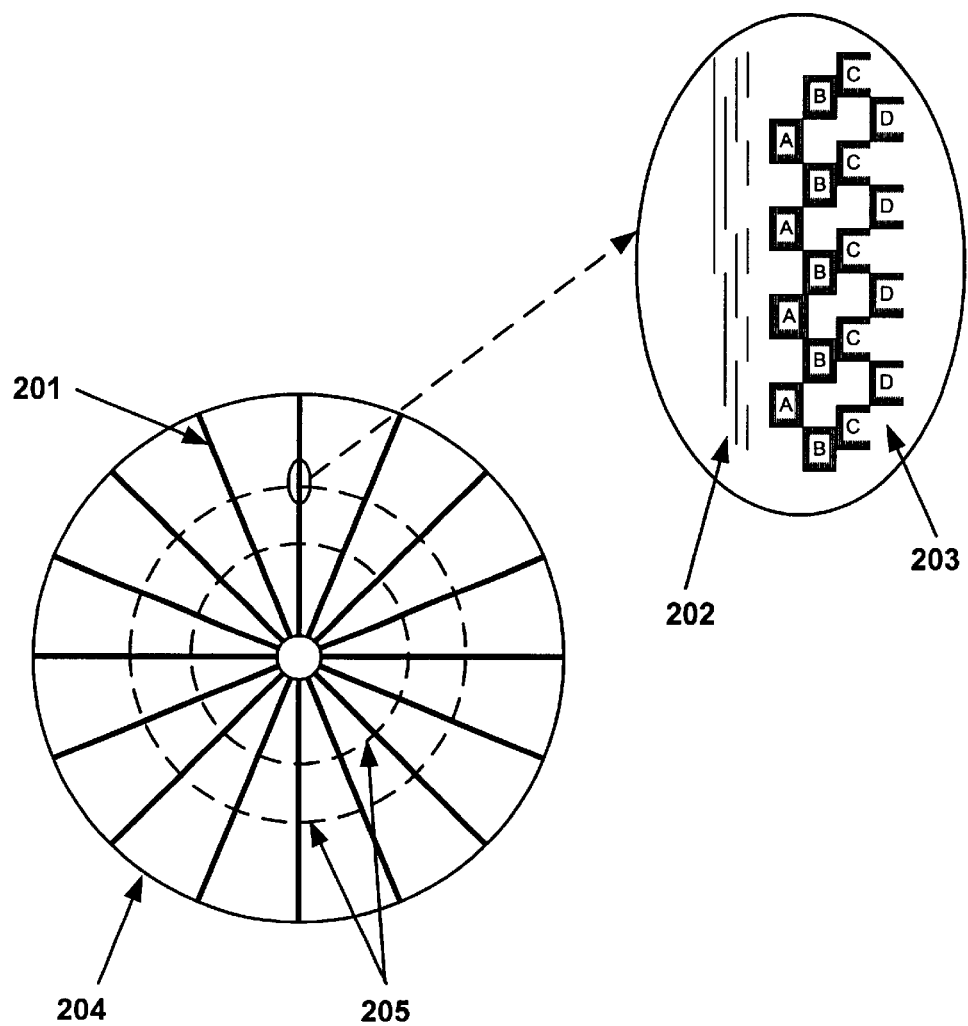
FIG. 2 is a simplified illustration of the placement of servo sectors on a disc surface in accordance with the preferred embodiment of the present invention.

FIG. 2 is a simplified illustration of the placement of servo sectors 201 on a disc surface 204 in accordance with the preferred embodiment of the present invention. Servo sectors 201 are usually placed within each track 205 on the disc surface 204. In a typical disc drive, the servo sectors 201 of adjacent tracks 205 are placed at similar circumferential locations around each track 205, thereby forming a spoke pattern emanating from the inner diameter to the outer diameter of the disc 204. The servo sectors 201 are used to determine the radial position of the read/write head relative to the disc surface 204 and relative to a track 205 center.

Servo sectors 201 typically consist of a Gray code field 202 to provide coarse position information (such as track number, cylinder number, etc.) and a servo burst 203 field to provide fine position information. Servo bursts 203 consist of one or more transitions that generate signals in the read transducer located in the read/write head. The most typical servo burst 203 arrangement, as shown in FIG. 2, is usually referred to as a quadrature (or ABCD) burst pattern. Note that FIG. 2 illustrates sixteen servo sectors 201 per revolution of the disc 204. There may be fewer, or in the usual case, many more servo sectors 201 than are illustrated. The radial position of the read/write head relative to the disc 204 surface can be determined accurately by measuring and decoding the Gray code field 202 and the magnitude of the signal generated by the servo bursts 203 as the read/write head travels over the disc surface 204.

Figure 3:
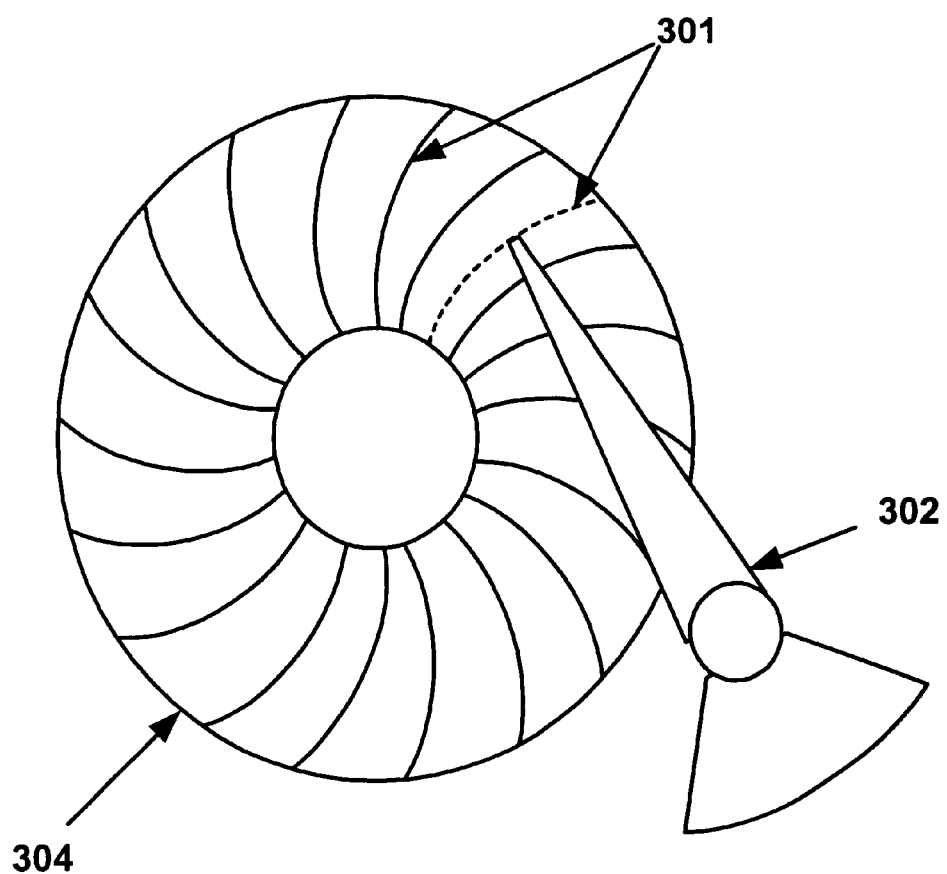
FIG. 3 illustrates the placement of servo sectors on a disc surface using a rotary actuator in accordance with an embodiment of the present invention.

FIG. 3 illustrates the placement of servo sectors 301 on a disc surface 304 using a rotary actuator 302 in accordance with an embodiment of the present invention. In disc drives with rotary actuators 302 the heads move across the disc 304 in an arc. Therefore, it is preferable to write the servo sectors 301 such that they form an arc to insure that the timing of the signals generated by the servo sectors 301 does not vary during seek operations. For discussion simplicity, however, it will be assumed that a linear actuator using linear servo sectors 201 (as shown in FIG. 2) are used. It should be noted, however, that the methods discussed in this invention are applicable to disc drives employing linear actuators and rotary actuators (among others) without modifications.

Figure 4:
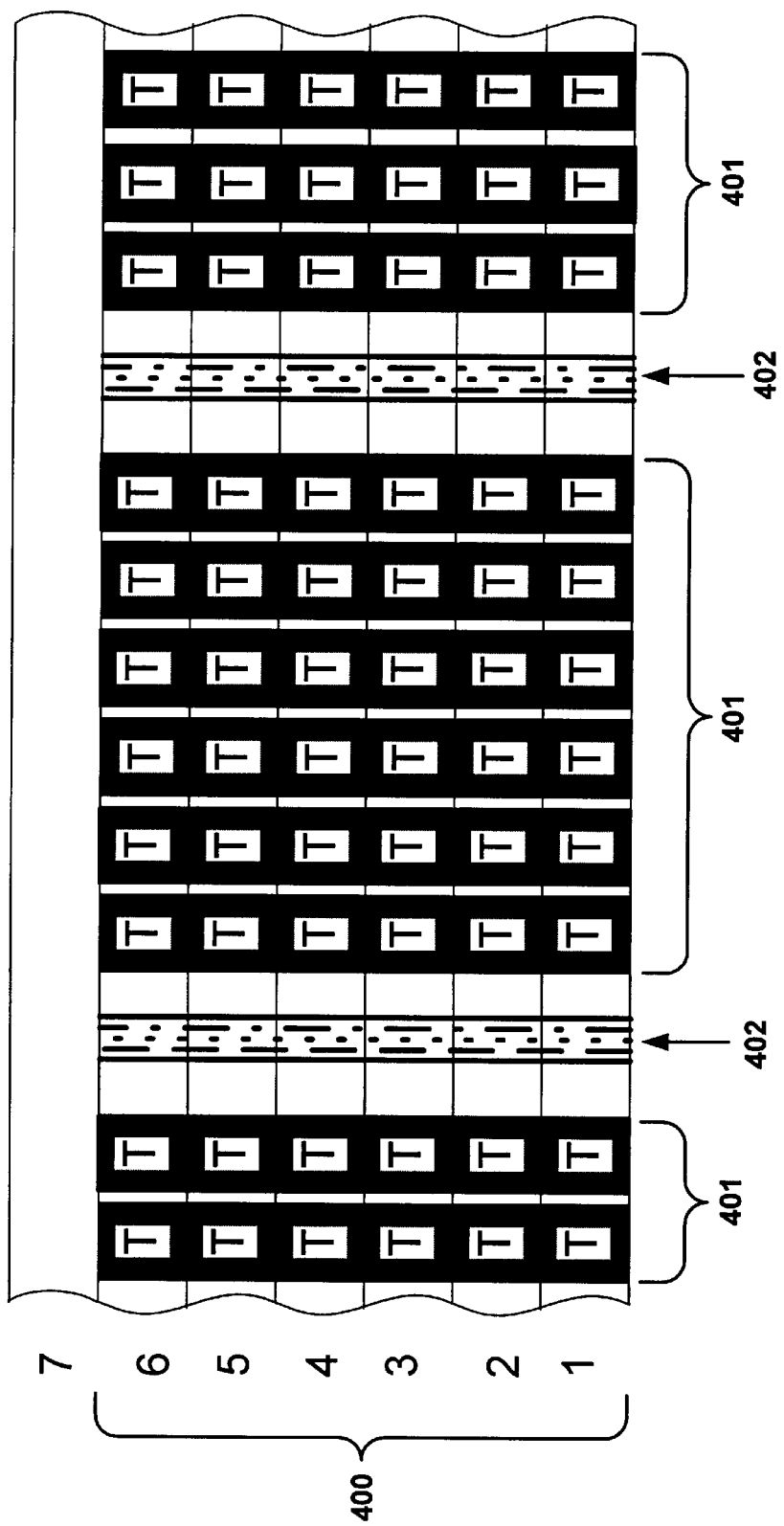
FIG. 4 is a detailed illustration of a portion of several adjacent servo tracks containing servo sectors and timing bursts in accordance with the preferred embodiment of the present invention.

FIG. 4 is a detailed illustration of a portion of several adjacent servo tracks containing servo sectors 402 and timing bursts 401 in accordance with the preferred embodiment of the present invention. FIG. 4 shows a guide pattern 400 comprised of six tracks, labeled 1 through 6. In the preferred embodiment, the guide pattern 400 is written with a conventional servowriter. The guide pattern 400 contains servo sectors 402 for accurate radial positioning of the read/write head. The guide pattern 400 also contains timing bursts 401, which are used to insure accurate circumferential positioning of the read/write head during normal operation and of the servo sectors 402 and read/write head during the propagation process. Each timing burst 401 consists of one or more magnetic transitions, "T". In a typical disc drive, 10 or more transitions are used, however, any number of transitions may be used while remaining within the scope of the present invention.

The accuracy of circumferential positioning is increased by aligning the timing bursts 401 of one track with the timing bursts 401 of an adjacent track. For example, the timing bursts 401 of track 2 are aligned with the timing bursts 401 of track 1 and track 3. The timing bursts 401 and servo sectors 402 written into the guide pattern 400 can be used to accurately propagate additional timing bursts 401 and servo sectors 402 to the unwritten area of the disc (here, track 7). Note that the preferred embodiment of the present invention will focus on how to insure precise circumferential positioning of the timing bursts 401 and servo sectors 402; the details of how to insure accurate radial propagation will not be discussed.

Figure 5:
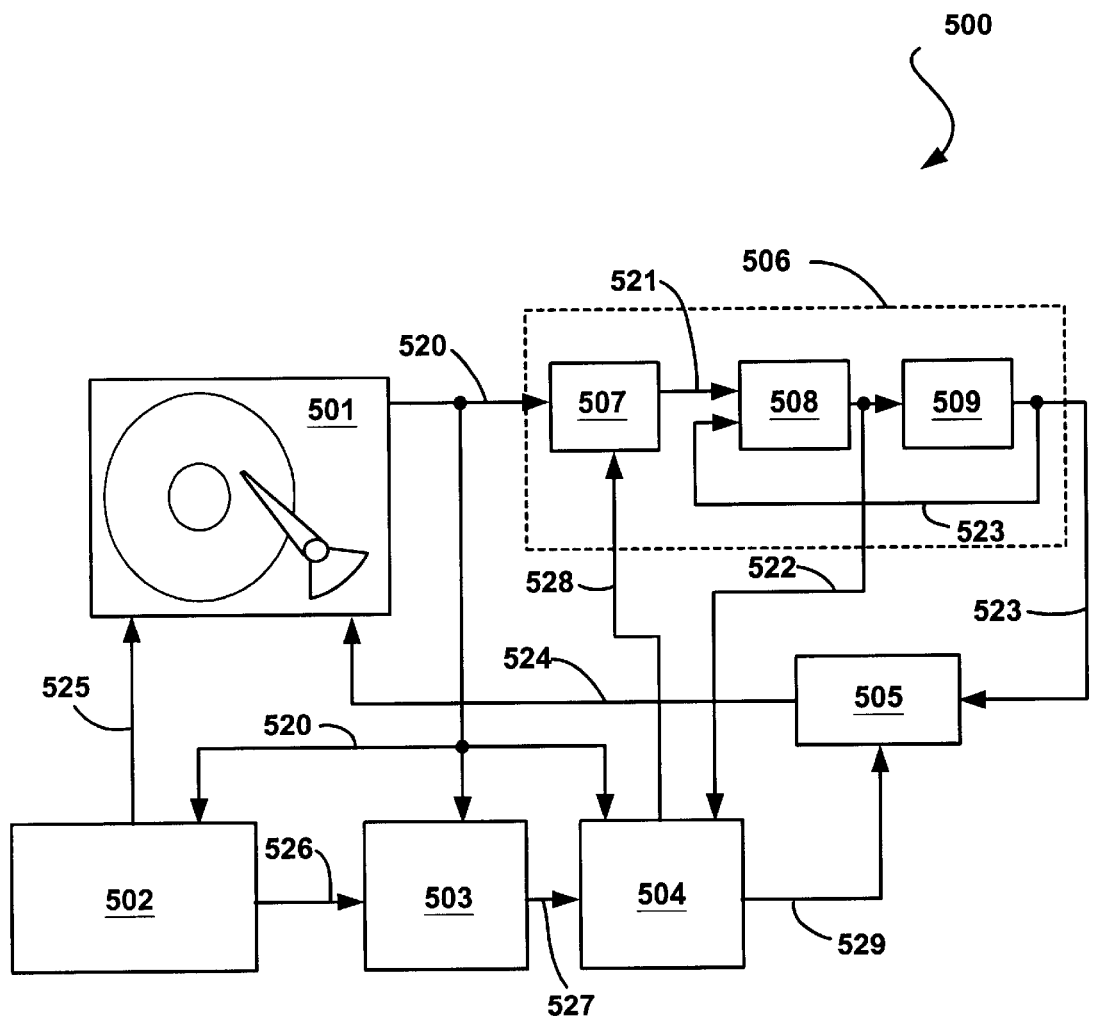
FIG. 5 illustrates a simplified block diagram of the system used for the propagation of timing bursts in accordance with the preferred embodiment of the present invention.

FIG. 5 illustrates a simplified block diagram of a control system 500 used for the propagation of timing bursts in accordance with the preferred embodiment of the present invention. Control system 500 includes a head-disk assembly ("HDA") 501, a servo controller circuit and spindle motor controller circuit 502, a time interval analyzer circuit 503, a timing controller circuit 504, a write head amplifier circuit 505, and a phase locked loop circuit ("PLL") 506. The HDA 501 includes a spindle motor, disc, actuator and read/write head. The PLL 506 includes a delay circuit 507, phase detector circuit 508, and a voltage controlled oscillator circuit ("VCO") 509.

The HDA 501 receives an actuator and motor drive signal 525 from the servo controller circuit and spindle motor controller circuit 502 and a write signal 524 from the a write head amplifier circuit 505. The actuator and motor drive signal 525 is used: (1) to move the actuator such that the read/write head is radially positioned relative to the disc and (2) to control the rotation of the spindle motor. The write signal 524 is used to store information (such as servo, timing, or user information among others) onto the disc surface when the write transducer is enabled. The HDA 501 transmits a read signal 520 to the servo controller circuit and spindle motor controller circuit 502, the time interval analyzer circuit 503, the timing controller circuit 504, and the PLL 506. The read signal 520 is used to retrieve information (such as servo, timing, or user information among others) from the disc surface when the read transducer is enabled.

The servo controller circuit and spindle motor controller circuit 502 can be implemented using discrete electrical components (such as resistors, capacitors, operational amplifiers, etc.), a single integrated circuit device (such as a circuit chip, etc.), and a circuit board among others. The servo controller circuit and spindle motor controller circuit 502 can be implemented as a single unit or separated into a separate servo controller circuit component and a spindle motor controller circuit component.

The servo controller circuit and spindle motor controller circuit 502 receives the read signal 520 and determines the position of the read/write head by decoding the read signal 520 generated within the read element by the servo sectors. The servo controller circuit and spindle motor controller circuit 502 then generates an appropriate actuator and motor drive signal 525 to position the read/write head. The servo controller circuit and spindle motor controller circuit 502, in addition to receiving signals from and transmitting signals to the HDA 501, transmits an index signal 526 to the time interval analyzer circuit 503. The index signal 526 is usually obtained from a spindle motor driver. The index signal 526 goes active at a predetermined spindle motor position in each disc revolution and can be used in conjunction with other signals (such as a signal induced by timing bursts) to determine the circumferential location of the read/write head relative to the disc surface.

The time interval analyzer circuit 503 can be implemented using discrete electrical components (such as resistors, capacitors, operational amplifiers, etc.), a single integrated circuit device (such as a circuit chip, etc.), and a circuit board among others. The time interval analyzer circuit 503, among other things, is used to measure the time interval between a first and second trigger event. In the preferred embodiment of the present invention, the first trigger event is a data, timing, or positioning transition (among others) that notifies the time interval analyzer circuit 503 to begin counting. The second trigger event is a data, timing, or positioning transition (among others) that notifies the time interval analyzer circuit 503 to stop counting. It should be noted that a trigger event may function as both a first and second trigger event. For example, a timing transition may notify the time interval analyzer circuit 503 to stop counting (i.e., act as a second trigger event) from a previous first trigger event, and simultaneously, notify the time interval analyzer circuit 503 to begin counting for the next time interval.

The time interval analyzer circuit 503 receives the index signal 526 and the read signal 520 and transmits a time interval signal 527 to the timing controller circuit 504. The time interval analyzer circuit 503 can be used compensate for variations in time delay present during disc drive operation, for example variations caused by a change in skew angle of the read/write head. The skew angle of the read/write head changes relative to the tangential of the tracks as the read/write head moves over the disc surface during the propagation process. Skew angle changes result in variation of the distance along the track or circumferential distance between the read element and write element, and has to be compensated by continuous adjustment of the time delay. The adjustment of the time delay can be accomplished by using the time interval analyzer circuit 503 to measure the time interval between a dedicated timing mark (e.g. the first timing mark of sector 0) and the index signal 526. As mentioned above, the index signal 526 goes active at a predetermined spindle motor position in each revolution.

The timing controller circuit 504 typically consists of a microprocessor and additional digital and analog circuits (e.g. various logic circuits, counters, analog-to-digital and digital-to-analog converters). The timing controller is typically integrated into the disc drive's main controller chip. The timing controller circuit 504 receives the read signal 520, the time interval signal 527, and the phase detector output signal 522. The timing controller circuit 504 transmits the write enable signal 529 to the write head amplifier circuit 505 and timing control delay signal 528 to the PLL's 506 delay circuit 507.

Delay circuit 507 delays the read signal 520 by a desired amount. The delay amount is adjusted via signal 528 by the timing controller. The desired delay is determined by the timing controller based on the PLL phase error signal 522 and the output of the time interval analyzer 503.

The write head amplifier circuit 505 can be implemented using discrete electrical components (such as resistors, capacitors, operational amplifiers, etc.), a single integrated circuit device (such as a circuit chip, etc.), and a circuit board among others. The write head amplifier circuit 505 generates write signal 524 which drives the write transducer such that the desired information is stored on the disc. In the preferred embodiment of the present invention, the write head amplifier circuit 505 is incorporated into the disc drive preamplifier chip.

The write head amplifier circuit 505 receives the PLL output signal 523 from the PLL 506 and the write enable signal 529 from the timing controller circuit 504, and at the appropriate time, sends the write signal 524 to the HDA 501. The PLL 506 can be synchronized to the signal generated in the read element (i.e., the read signal 520) by the timing bursts. The PLL output signal 523 and timing controller 504 ensures that the write transducer is in the correct circumferential position, relative to the disc, before the write head amplifier circuit 505 supplies write current to the write transducer.

The PLL 506 includes a delay circuit 507, phase detector circuit 508, and a voltage controlled oscillator ("VCO") 509. An additional component may be added or a current component removed or modified to obtain the PLL output signal 523. The delay circuit 507 can be implemented using discrete electrical components (such as resistors, capacitors, operational amplifiers, etc.), a single integrated circuit device (such as a circuit chip, etc.), and a circuit board among others. In the preferred embodiment of the present invention, the delay circuit 507 is used to adjust the phase or relative delay (such as may be caused by electrical delays, longitudinal reader-writer spacing, etc.) between the signal obtained from the timing transitions read by the read element (i.e., the read signal 520) and the PLL output signal 523.

The phase detector circuit 508 can be implemented using discrete electrical components (such as resistors, capacitors, operational amplifiers, etc.), a single integrated circuit device (such as a circuit chip, etc.), and a circuit board among others. The phase detector circuit 508 is used to determine the phase difference between two or more signals in order to produce a phase error signal. In the preferred embodiment of the present invention, the phase error signal represents the difference between the VCO 509 output signal (i.e., the signal used to drive the write element) and sum of the read signal 520 (with various disturbances) and the delay signal 521.

The VCO 509 can be implemented using discrete components (such as resistors, capacitors, operational amplifiers, etc.), a single integrated circuit device (such as a circuit chip, etc.), and a circuit board among others. The VCO 509 can be any electronic or mechanical device whose output is varied by changing an input frequency, voltage, or capacitance value among others.

In a preferred embodiment, the PLL output signal 523 is transmitted back to the phase detector circuit 508, forming the PLL feedback loop. Additionally, the configuration of the PLL's 506 components may also be varied and remain within the scope of the present invention. For example, the delay circuit 507 may be placed after the PLL loop or the delay circuit 507 may be placed within the PLL feedback loop itself. There may be cases where such alternate placement of the delay circuit 507 may be advantageous. Such variations are within the scope of this invention and do not materially alter the propagation process described below.

During the propagation process the timing controller circuit 504 continuously monitors the time interval between the index signal 526 and a dedicated timing burst, and adjusts the delay circuit 507 such that the time interval remains constant. This insures that the timing bursts and servo sectors propagate along a straight, radial line, from the disc's inner diameter to the disc's outer diameter.

Figure 6:
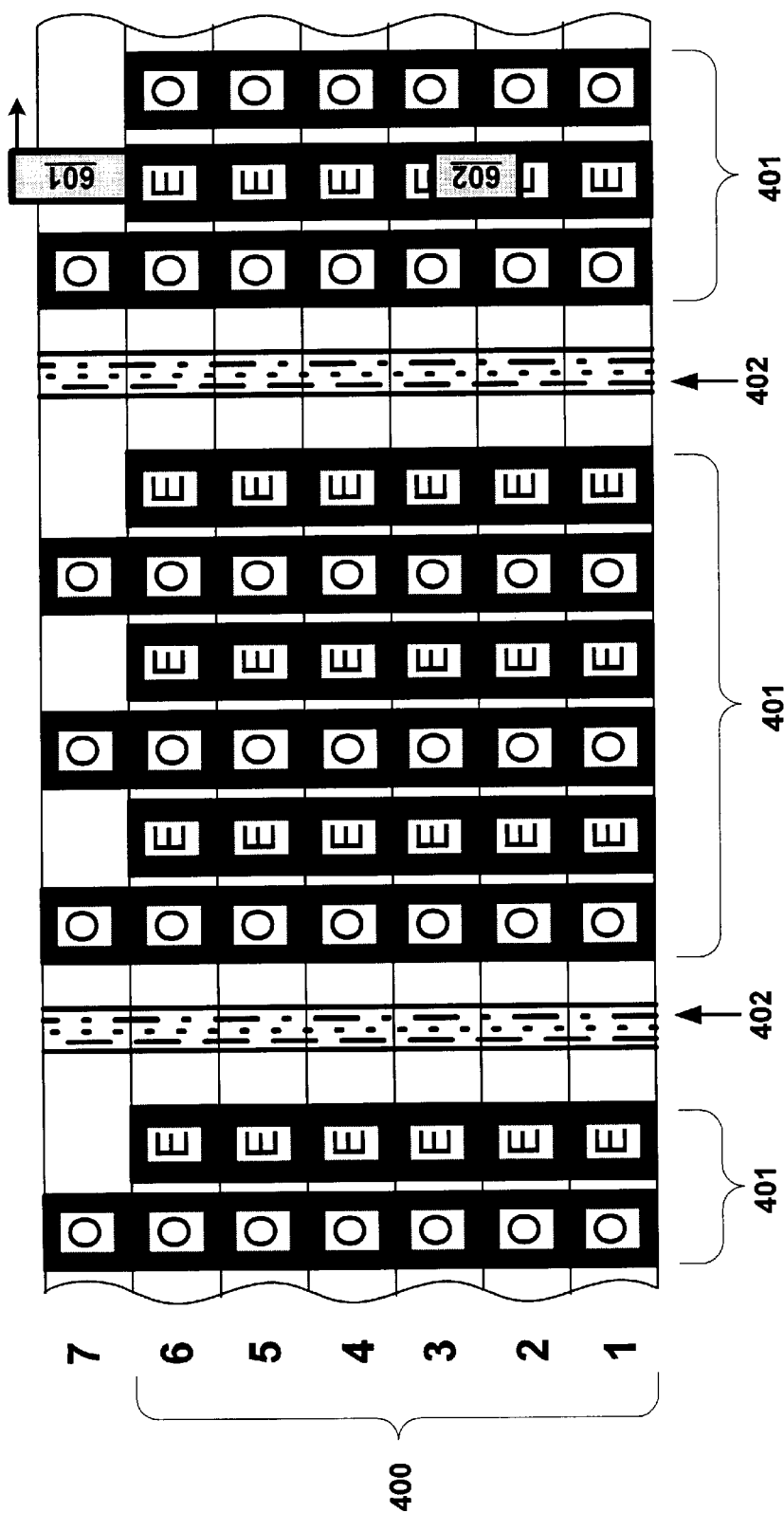
FIG. 6 is a detailed illustration of a portion of several adjacent servo tracks in which a timing burst is propagated in accordance with the preferred embodiment of the present invention.

FIG. 6 is a detailed illustration of a portion of several adjacent servo tracks in which timing bursts 401 are being propagated in accordance with the preferred embodiment of the present invention. The timing bursts 401 are divided into "odd" and "even" bursts, labeled with "O" and "E", respectively. In FIG. 6, the servo tracks are shown horizontally across the page, and the track numbers on the left side of the illustration correspond to horizontal lines that represent data track center locations. Tracks 1 through 6, in the preferred embodiment, make up guide pattern 400 and are written using a conventional servowriter. It should be noted, however, that the guide pattern 400 can be written using self-propagating servo writing techniques (among others), and the number of tracks within the guide pattern 400 may be varied. Furthermore, the guide pattern 400 may be written at any location on the disc and the subsequent direction of propagation may be either towards the inner diameter or towards the outer diameter of the disc.

The propagation process starts by positioning the read/write head such that the edge of the write element 601 closest to the read element 602 is aligned with the border of the servo track to have the timing burst 401 written thereto and the last completely written servo track. As shown in FIG. 6, servo track 6 is the last track of the guide pattern 400 and track 7 is the track to have the timing bursts 401 written. Other read/write head alignments may be used while remaining within the scope of the present invention. As shown in FIG. 6, the offset between the edge of the write element 601 and the center of the read element 602 is equal to 4 tracks. Therefore, the center of the read element 602 is positioned at the border of track 2 and track 3. The four-track offset between the write element 601 and the read element 602 is used for exemplary purposes only, and the present invention applies to offsets greater than or less than four tracks. It should be noted that the offset is greater than the width of the read element 602 and the write element 601.

The propagation of timing bursts 401 requires two disc revolutions for each servo track. During the first revolution the PLL 506 is synchronized to the even ("E") timing transitions. In other words, when the read element 602 and write element 601 travel over the odd ("O") timing transitions, the controller circuit 504 enables the write element amplifier circuit 505, and the write element 601 writes odd timing transitions on servo track 7. In a typical disc drive, read and write operations are not simultaneously completed. In other words, the magnetic transitions on the disc are not read while other transitions are being written. Therefore, the PLL 506 is constrained to function from internal phase and frequency references (or coast) when the write element 601 is writing odd transitions.

The delay circuit 507 placed before the PLL loop is used to adjust the phase, or relative delay, between the signal obtained from the timing transitions read by the read element 602 (i.e., the read signal 520) and the PLL output signal 523. The delay signal is used to compensate for timing irregularities caused by electrical delays and longitudinal reader/writer spacing, among others. With an appropriate setting of the delay signal 521, the transitions written by the write element 601 can be aligned with the timing transitions already on the disc (here the transitions in tracks 1 through 6). It should be noted that in addition to timing bursts 401, servo sectors 402 can also be written to appropriate locations during this disc revolution.

During the next revolution of the disc, the roles of odd and even timing transitions are exchanged. The PLL 506 is synchronized to the odd ("O") timing transitions and even timing transitions are written to track 7. The PLL 506 coasts while the read element 602 is over an even ("E") timing transition. Thereafter, the read element 602 and write element 601 are moved to the next track (here track 8), and the propagation process is repeated. If the propagation process is continued such that the read element 602 reaches the end of the guide pattern zone 400, servo and timing information is obtained from the servo bursts 402 and timing bursts 401 previously written by the write element 601 (e.g., track 7, track 8, etc.). Therefore, propagation can continue until the desired number of timing bursts 401 and servo sectors 402 are written to the disc.

Figure 7:
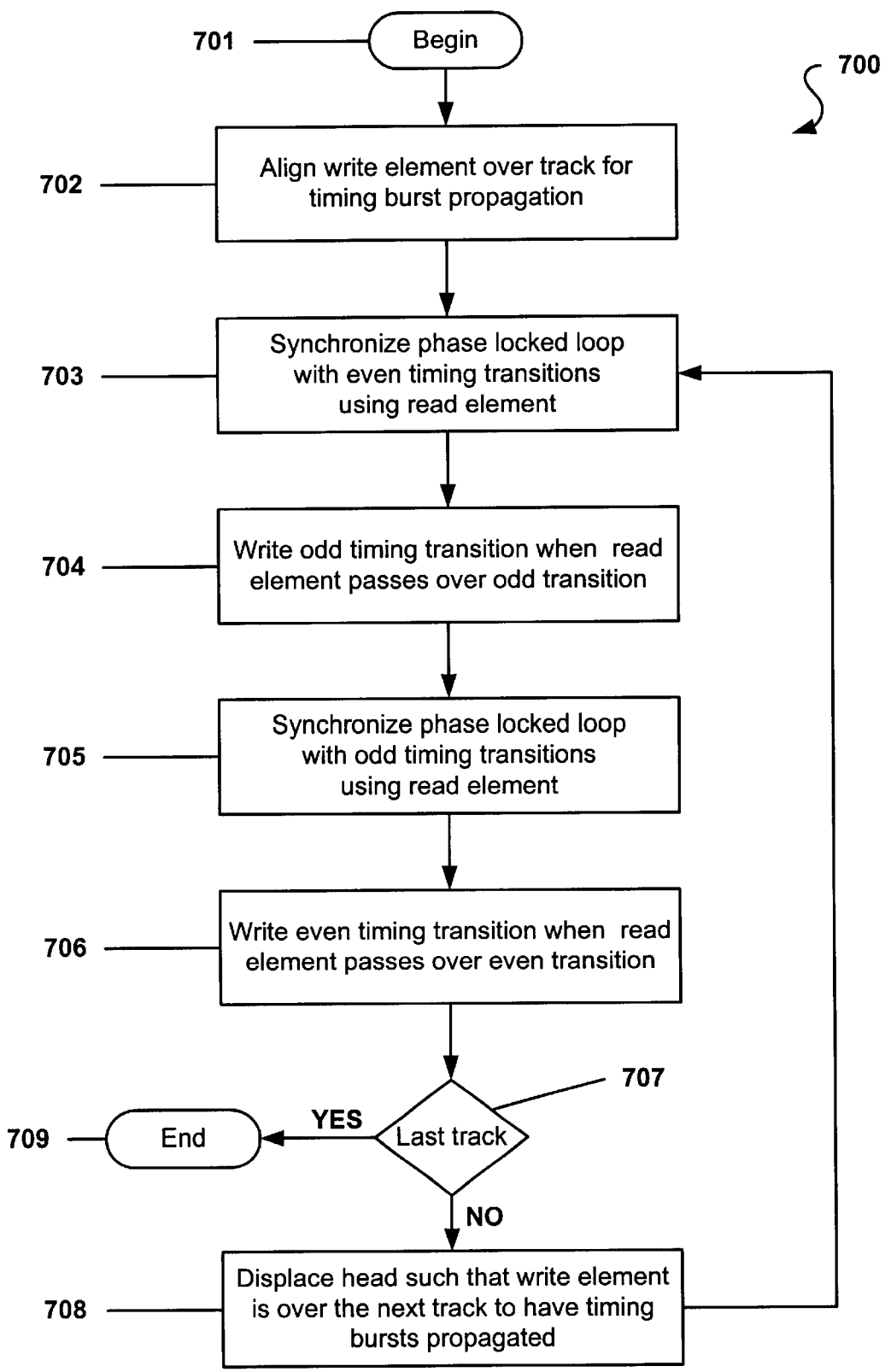
FIG. 7 is a flow chart of an operational process used to propagate timing bursts in accordance with the preferred embodiment of the present invention.

FIG. 7 is a flow chart of operational process 700 used to propagate timing bursts in accordance with the preferred embodiment of the present invention. Operational process 700 is initiated with begin operation 701. In the preferred embodiment, the manufacturer initiates operation 701 during disc drive manufacturing process. Operational control is then passed to operation 702.

Operation 702 aligns the write element over the target track or the track in which timing bursts are to be written. In the preferred embodiment, a guide pattern 400 containing servo sectors 402 and timing bursts 401 is written onto the disc drive. The read element 602 obtains positional information from the guide pattern 400. The read element 602 is radially offset from the write element 601, relative to the disc surface, a known distance. The correct read element 602 location is obtained by subtracting the offset amount, or the distance between the read element 602 and write element 601 (for example, the reader/writer offset is 4 tracks as shown in FIG. 6), from the target track position (for example track 7 as shown in FIG. 6). The read element 602 then "follows" its position as the timing bursts 401 are written to the target track.

In the preferred embodiment, the read/write element offset is calibrated using the following method, although any method of determining the offset between the read element 602 and the write element 601 can be used to implement the present invention. First, a track following operation is completed and the position of the read element 602 is designated as $x_1$. Next, a temporary pattern is written with the write head 601 while the read element 602 remains at $x_1$. Then, the read head 602 is displaced towards the temporary pattern until the signal generated in the read head 601 by the temporary pattern is maximal. This position is designated as $x_2$. The reader writer offset is then calculated as $x_1-x_2$. The reader/writer offset is calculated at multiple radial locations along the surface of the disc in order to compensate for a change in virtual reader/writer offset. Virtual reader/writer offset occurs as a rotary actuator displaces the read/write head relative to the surface of the disc. Virtual offset and its effects are well known in the art. Operational control is passed to operation 703 after operation 702 aligns the write element 601 over the track in which timing bursts are to be written.

Operation 703 synchronizes the PLL with the even timing transitions using the read element. In other words, the PLL is set such that when the read element is over an even timing transition, the timing controller disables the write head amplifier circuit. In the preferred embodiment, the read element 602 is used to sense the even ("E") timing transitions and obtain positional information. When the read element 602 senses an even timing transition, the timing controller circuit 504 disables the write head amplifier circuit 505.

Operational control is then assumed by operation 706 after the PLL is synchronized with the even timing transitions. Operation 706 writes odd timing transitions onto the disc surface. By synchronizing the PLL with the odd timing transitions, the write element head amplifier circuit is only enabled when the write element is in position to write an even timing transition. In the preferred embodiment, the timing controller circuit 504 enables the write head amplifier circuit 505 when the read element 602 passes over an even transition and the write element 601 writes even ("E") timing transitions onto the servo track. In a typical disc drive the magnetic transitions on the disc cannot be read while writing other transitions. Therefore, the PLL 506 is constrained to function from internal phase and frequency references (or coast) when the write element 601 is writing the odd transitions.

Operational control is assumed by operation 705 after the odd timing transitions have been written to the desired servo track. Operation 705 synchronizes the PLL with the odd timing transitions using the read element. In other words, the PLL is set such that when the read element is over an odd timing transition, the timing controller circuit disables the write head amplifier circuit. In the preferred embodiment, the read element 602 is used to sense the odd ("O") timing transitions and obtain positional information. When the read element 602 senses an odd timing transition, the timing controller circuit 504 disables the write head amplifier circuit 505.

Operational control is then assumed by operation 706 after the PLL is synchronized with the odd timing transitions. Operation 706 writes even timing transitions onto the disc surface. By synchronizing the PLL with the odd timing transitions, the write head amplifier circuit is only enabled when the write element is in position to write an even timing transition. In the preferred embodiment, the timing controller circuit 504 enables the write head amplifier circuit 505 when the read element 602 passes oven an even transition and the write element 601 writes even ("E") timing transitions onto the servo track. In a typical disc drive the magnetic transitions on the disc cannot be read while writing other transitions. Therefore, the PLL 506 is constrained to function from internal phase and frequency references (or coast) when the write element 601 is writing even transitions.

Operational control is assumed by determination operation 707 after the even timing transitions have been written to the desired servo track. Determination operation 707 ascertains whether all of the desired tracks have had timing bursts written to them. If the current track is the last track to receive timing burst information, operational control branches YES and operation 709 terminates operational process 700. If timing bursts need to be written to another track, operational control branches NO and operation 708 assumes control. Operation 708 displaces the read/write head such that the write element is aligned over the next track that is to have timing bursts written to it. In the preferred embodiment, timing bursts 401 are written to each track on the disc surface. Also in the preferred embodiment, timing bursts 401 and servo sectors 402 are written during the same disc revolutions such that the read element 602, after exiting the guide pattern 400, receives radial positional information from the self-propagated servo sectors 402 and circumferential positional information from the timing bursts 402.

It should be noted that minor changes might be made to operational process 700 while remaining within the scope of the present invention. For example, a guide pattern 400 can be written onto the disc at any location and the propagation can be completed in any direction relative to the surface of the disc (for example, from the inner to outer diameter or from the outer to the inner diameter). Furthermore, the order for writing timing transitions can be changed (e.g., write the even transitions first and the odd transitions second among others) while remaining within the scope of the present invention.

Figure 8:
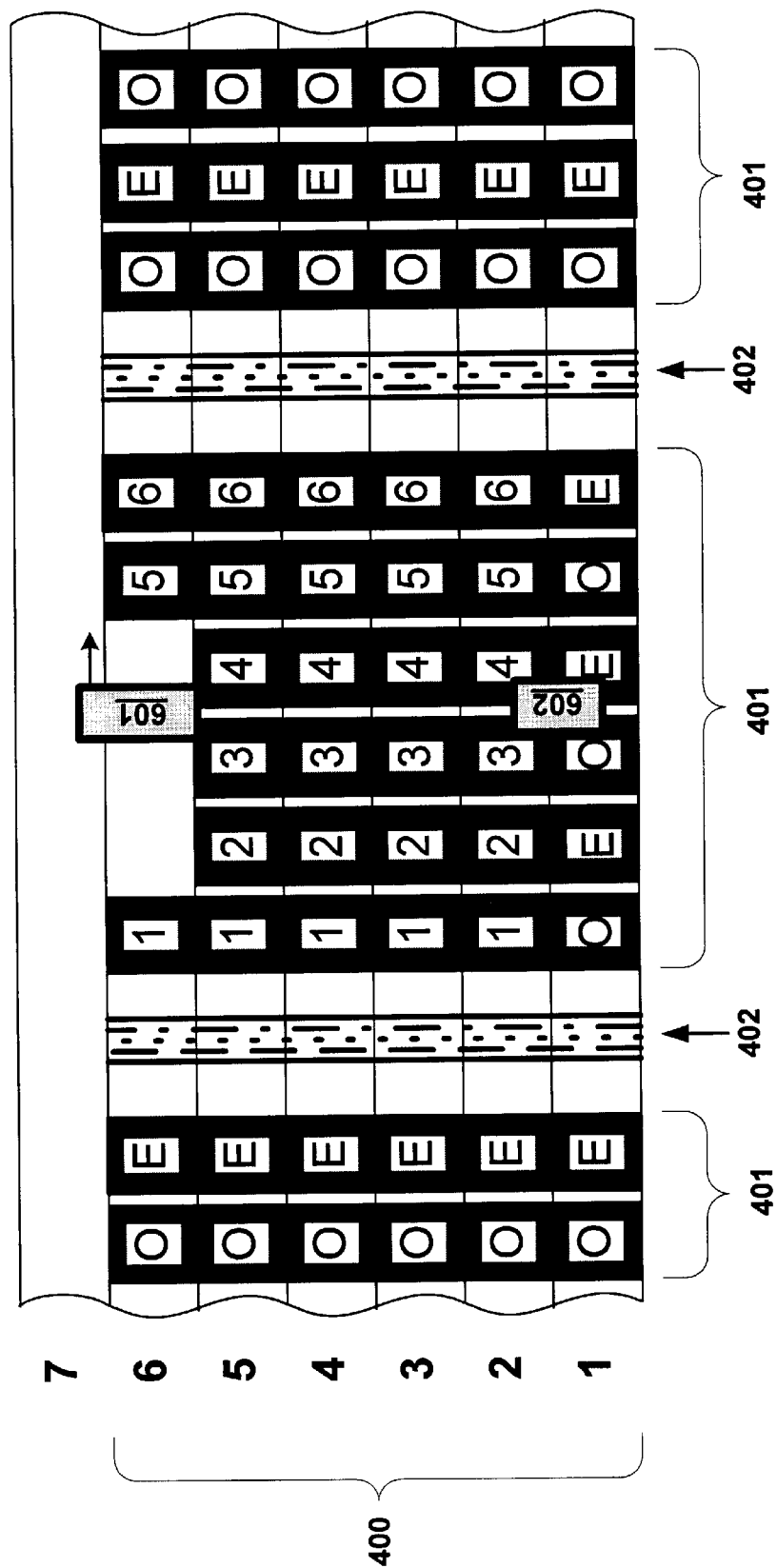
FIG. 8 is a detailed illustration of a portion of several adjacent servo tracks in which a timing burst is erased for calibration of the phase-locked-loop's delay circuit in accordance with the preferred embodiment of the present invention.

FIG. 8 is a detailed illustration of a portion of several adjacent servo tracks in which timing bursts are erased for calibration of the delay circuit in accordance with the preferred embodiment of the present invention. In the preferred embodiment, the delay circuit is calibrated multiple times throughout the propagation process, preferably at several adjacent tracks. Multiple calibrations ensure that timing errors are not carried forward as the propagation process is completed. Calibration of the delay circuit begins by erasing a series of timing transitions that were previously written on the disc. Referring now to FIG. 8, the read element 602 is used to obtain positioning information and the write element 601 is aligned over track 6. The timing transitions 2, 3, and 4 on track 6 are erased by providing a write enable signal to the write element 601 while "writing" a null signal to the disc. It should be noted that the timing transitions chosen are for exemplary purposes only and different timing transitions, or a different number of timing transitions, can be used while remaining within the scope of the present invention.

Figure 9:
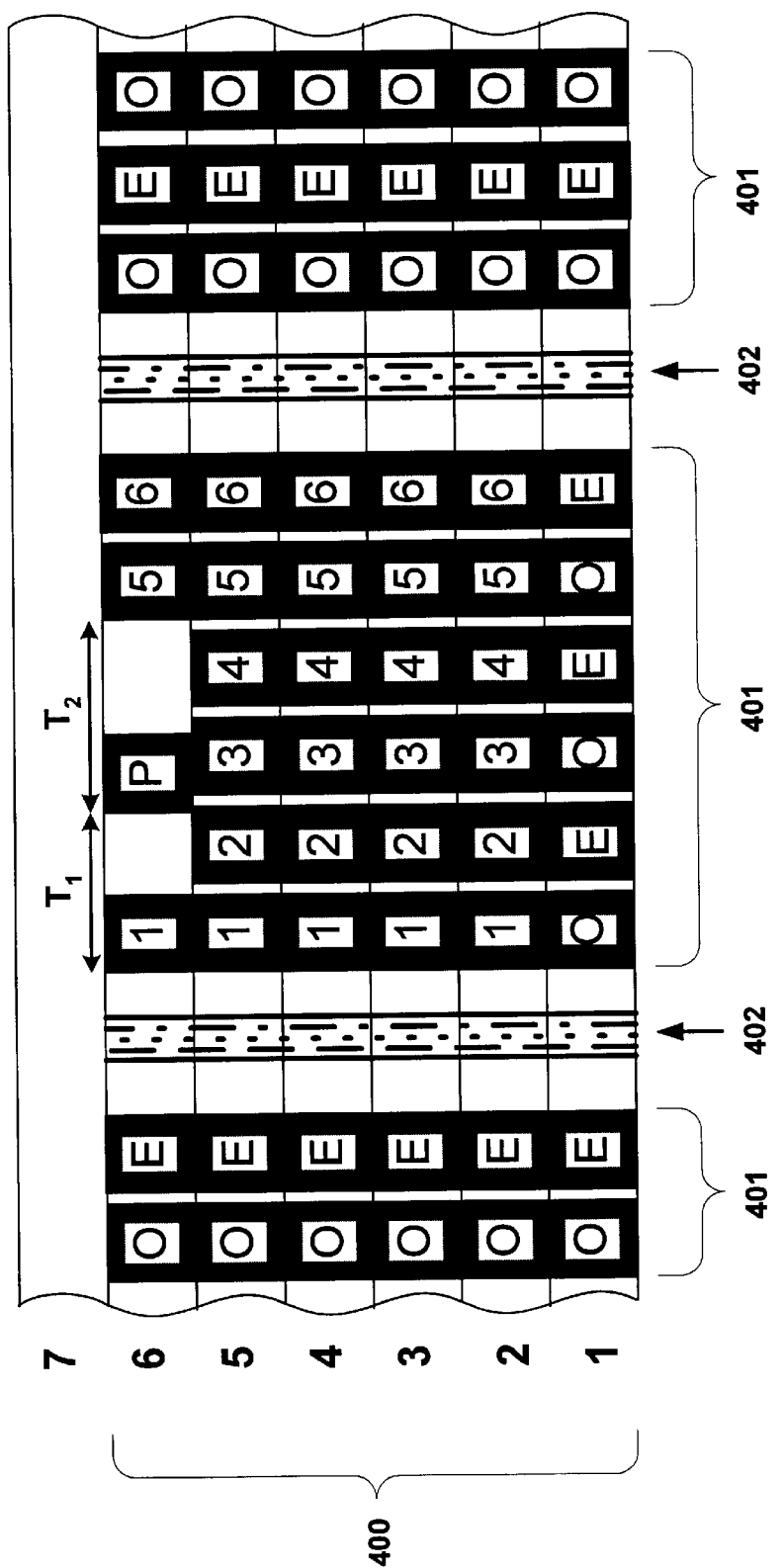
FIG. 9 is a detailed illustration of a portion of several adjacent servo tracks in which a timing burst is written for calibration of the phase-locked-loop's delay circuit in accordance with the preferred embodiment of the present invention.

After the timing transitions are erased, a calibration timing burst is written in within the erased zone. FIG. 9 is a detailed illustration of the portion of several adjacent servo tracks in which the calibration timing burst, "P", is written for calibration of the delay circuit in accordance with the preferred embodiment of the present invention. The calibration timing burst P is written to the location where the timing burst has been erased in the previous step (i.e., transitions 2, 3, and 4 of track 6). Two time intervals, chosen such that if the two intervals are equal the time delay for the delay circuit is correct, are measured. If the two time intervals are not equal, the calibration timing burst P is erased, the time delay adjusted, and a new calibration timing burst P is written. The process continues until the correct time delay is determined.

In the preferred embodiment, the PLL is synchronized to the even timing bursts and an odd calibration timing burst P is written to the location of the erased timing burst (i.e., at transition locations 2, 3, and 4 on track 6). In an alternative embodiment, the PLL is synchronized to the odd timing burst and an even calibration timing burst P is written. After writing the calibration timing burst P, a first time interval $T_1$ is measured from the beginning of the timing burst preceding and adjacent the erased area (here timing transition 1) to the beginning of the calibration timing burst (timing burst P). A second time interval $T_2$ is then measured from the beginning of the calibration timing burst (timing burst P) to the beginning of the timing burst subsequent to and adjacent to the erased area (here timing transition 5). The time intervals $T_1$ and $T_2$ are measured using the time interval analyzer circuit. If $T_1 \neq T_2$, the delay of the delay circuit is modified using the equation $T=T+T_2-T_1$, and the current calibration timing burst P is erased and a new calibration timing burst P is written. When $T_1=T_2$, the newly written burst aligns with the prewritten burst on the previous track and the delay circuit is set correctly. The calibration process is complete when $T_1=T_2$.

It should be noted that a different number of bursts can be erased and a different equation used to determine the time delay while remaining within the scope of the present invention. Furthermore, multiple calibration timing bursts can be written at different timing bursts locations around a track and an average value calculated and used as the delay value.

Figure 10:
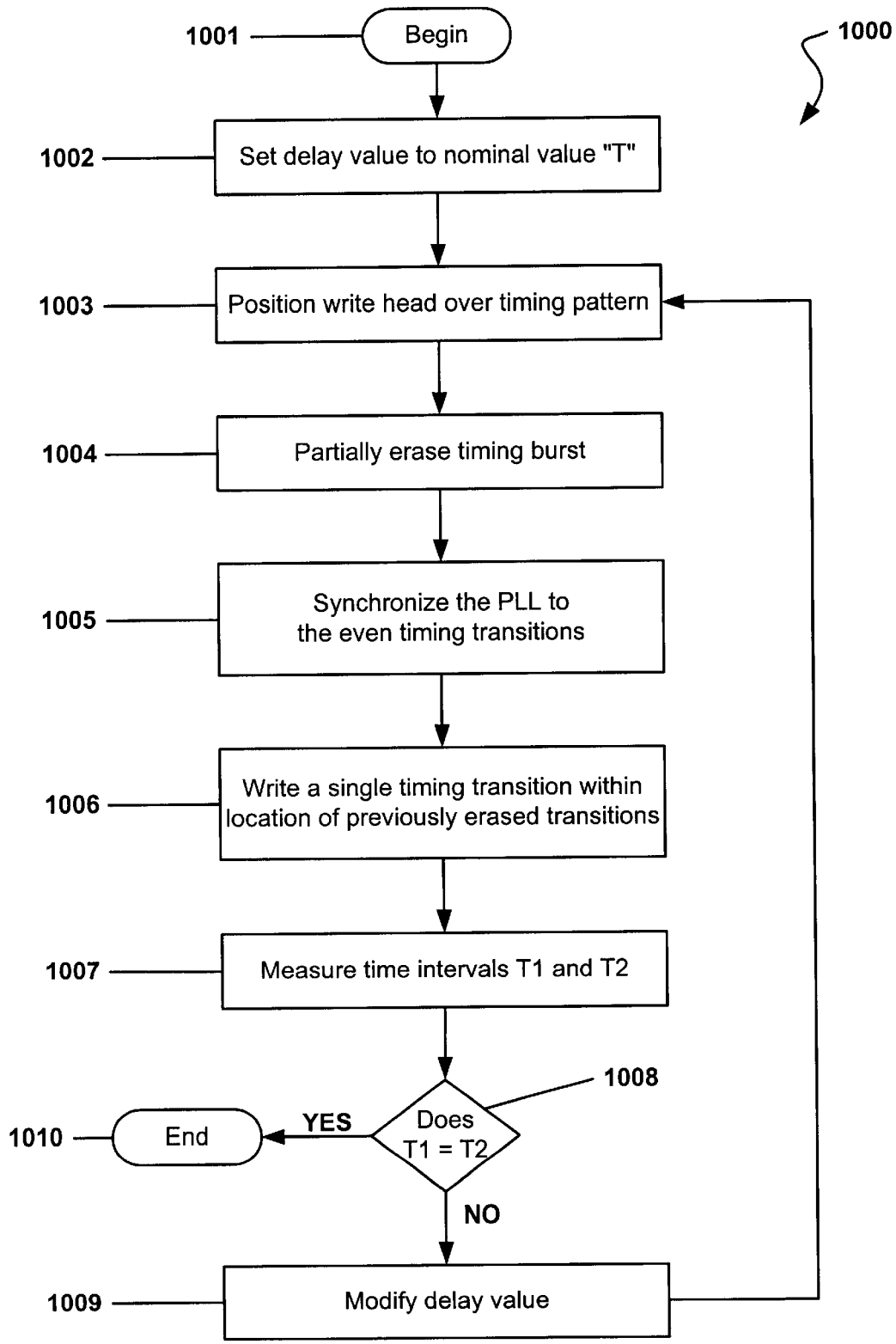
FIG. 10 is a flow chart of an operational process used to calibrate the phase-locked-loop delay circuit used in the propagation of timing bursts in accordance with the preferred embodiment of the present invention.

FIG. 10 is a flow chart of an operational process 1000 used to calibrate the time delay circuit used in the propagation of timing bursts in accordance with the preferred embodiment of the present invention. Operational process 1000 is initiated with begin operation 1001. In the preferred embodiment, the manufacturer initiates operation 1001 when the timing bursts 401 are being written to the disc drive during the disc drive manufacture process. Operational control is then passed to operation 1002.

Operation 1002 sets the delay value of the delay circuit to a nominal value "T". The nominal delay is determined from the nominal delays of the electrical circuits and the nominal delays caused by the longitudinal distance between the read head and write head. After a nominal value is chosen, operational control is surrendered to operation 1003.

Operation 1003 positions the write head over a previously written timing burst. The timing burst can be located within a guide pattern track, or within a propagated track. In the preferred embodiment, the timing burst pattern 401 chosen is located within the last track to have timing bursts 401 written. As shown in FIGS. 8 and 9, track 6 is the last track to have timing bursts 401 written within it. Therefore, the write element 601 is located over track 6. Positioning information is gathered by the read element 602, which remains within the servo track guide pattern 400 due to the reader/writer offset.

Operation 1004 assumes control from operation 1003. Operation 1004 partially erases a timing burst pattern. In the preferred embodiment, three timing bursts are erased. Referring to FIGS. 8 and 9, timing burst 2, 3, and 4 are erased from track 6. The bursts are erased by simultaneously transmitting an enable signal and null signal to the write element 601. It should be noted that the number and position of the transitions erased may be varied while remaining within the scope of the present invention.

Operational control is then assumed by operation 1005. Operation 1005 synchronizes the PLL to the even timing bursts. In other words, the PLL is set such that when the read element is over an even timing burst, the timing controller disables the write amplifier. In the preferred embodiment, the PLL is synchronized to even ("E") timing bursts that are being sensed by the read element 602. Synchronizing to a previously written timing burst 401 aids in ensuring that the propagated timing burst 401 will be properly aligned with the previously written timing bursts 401. Operational control is then surrendered to operation 1006.

Operation 1006 writes a calibration timing burst within the location of the previously erased timing transitions. Due to various unknown factors (such as uncertainty of electrical delays, variation of longitudinal reader/writer spacing, etc.) the calibration timing burst may not be perfectly aligned with the previously written timing transitions on the previous tracks. FIG. 9 illustrates the calibration timing burst "P" written to the location where the timing transitions were previously erased. As shown in FIG. 9, the calibration timing burst P is an odd ("O") timing transition that is not perfectly aligned with the previously written odd timing transition (i.e., timing transition 3 of track 5). Operational control is then surrendered to operation 1007 after the calibration timing burst is written to the disc.

Operation 1007 measures the time intervals between the calibration timing burst and nearby trigger transitions. In other words as the write element encounters a first trigger transition located prior to the calibration timing burst, a timer begins to operate. The timer measures the time interval between the trigger transition and the calibration timing transition. This interval is given the designation "$T_1$". The timer also measures the time interval between the calibration timing transition and a second trigger transition located subsequent to the calibration timing transition. This interval is designated as "$T_2$".

In the preferred embodiment, the first trigger transition (located prior to the calibration timing transition) is the timing transition located immediately before the erased timing transition zone. Referring to FIGS. 8 and 9, the write element 601, aligned with track 6, is shown moving from left to right relative to the disc surface (i.e., the disc is spinning counterclockwise). Timing transition 1 on track 6 is located immediately before the erased timing transition zone, and therefore, is the used as the first trigger transition. The interval $T_1$ is the period of time necessary for the write element 601 to travel from the leading edge of burst 1 of track 6 to the leading edge of the calibration timing burst P. Furthermore, timing burst 5 on track 6 is located immediately after the erased timing transition zone, and therefore, is the used as the second trigger transition. The interval $T_2$ is the period of time necessary for the write element 601 to travel from the leading edge of the calibration timing burst P to the leading edge of burst 5 of track 6. It should be noted that other trigger transitions (including non-timing and non-adjacent bursts) can be used with minor calculation adjustments while remaining within the scope of the present invention. In the preferred embodiment, the time interval analyzer circuit is used to measure the timing intervals $T_1$ and $T_2$.

Operation 1008 assumes control after the timing intervals $T_1$ and $T_2$ have been measured. Operation 1008 determines whether the timing intervals $T_1$ and $T_2$ are equal. If the timing intervals $T_1$ and $T_2$ are equal, the timing delay is correct and operational control braches YES such that operation 1010 assumes control. Operation 1010 terminates operational process 1000. If the timing intervals $T_1$ and $T_2$ are not equal, the timing delay is incorrect and operational control branches NO such that operation 1009 assumes control. Operation 1009 modifies the delay value (e.g., changes the nominal value of T set in operation 1002) and surrenders control to operation 1003. Operations 1003 to 1009 are repeated until the correct delay value is determined (i.e., until $T_1=T_2$).

In the preferred embodiment, the trigger transitions are chosen such that the timing delay is correct when the timing intervals $T_1$ and $T_2$ are equal. In other words when $T_1=T_2$, the calibration timing burst will be correctly aligned with the previous track's timing bursts.

Figure 11:
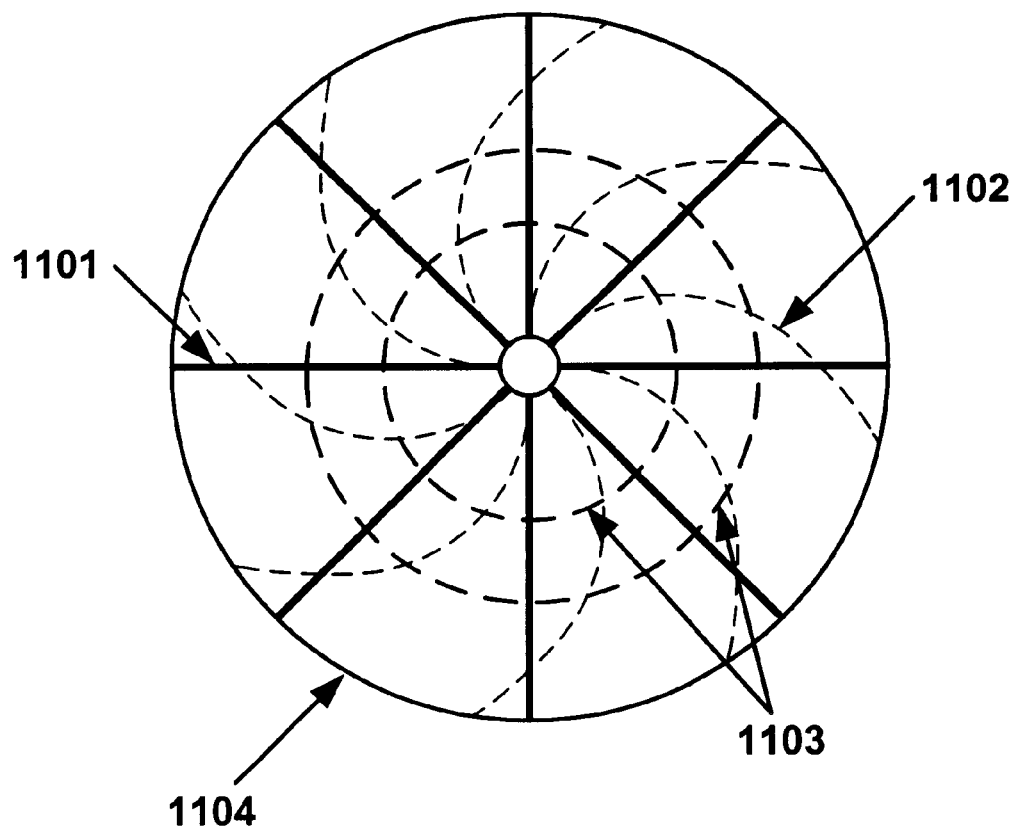
FIG. 11 illustrates the placement of servo sectors on a disc surface wherein the servo sectors contain static timing errors.

FIG. 11 illustrates the placement of servo sectors on a disc surface wherein the servo sectors contain static timing errors. Operational process 1000 gives an accurate calibration method for the delay unit to start the propagation process. However, the calibration will inevitably have some inaccuracy. Although slight inaccuracies do not cause significant track-to-track alignment errors, they do accumulate during the propagation process and may cause the timing bursts to diverge from the proper circumferential location resulting in spiral shaped servo wedges 1102. This error is usually referred to as static timing error. The spiral shaped servo wedges 1102, resulting from the presence of static timing errors, are compared to servo wedges 1101 that do not contain static timing errors.

It should also be noted that as the head moves over the disc surface 1104 during the propagation process, the skew angle of the heads changes relative to the tangential of the tracks 1103. The change in skew angle results in variation of the distance along the track 1103, or circumferential distance between the read element and write element, and has to be compensated by continuous adjustment of the time delay.

The time delay adjustment can be accomplished by using the time interval analyzer circuit to measure the time interval between a dedicated timing burst (e.g. the first timing mark of sector 0) and an absolute index signal. This index signal goes active at a predetermined spindle motor position in each revolution. The index signal can usually be obtained from the spindle motor driver and is a commonly available signal in many disc drive designs.

During the propagation process the timing controller circuit continuously monitors the time interval between the index signal and the dedicated timing burst, and adjusts the delay circuit such that the time interval remains constant. This insures that the timing bursts and servo sectors propagate along a straight radial line (i.e., as illustrated by servo marks 1101 in FIG. 11).

Figure 12:
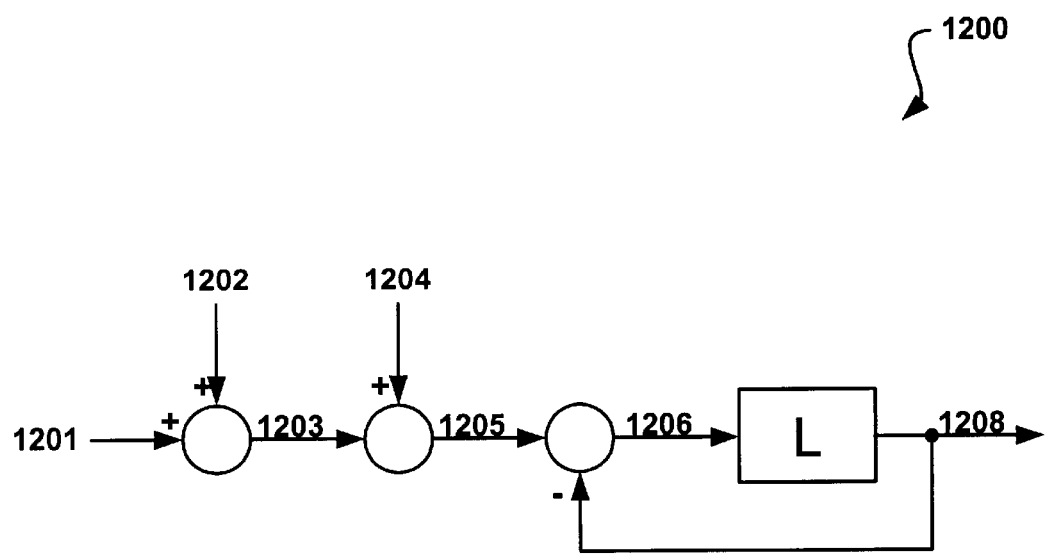
FIG. 12 illustrates a functional block diagram of a phase-lock-loop timing system in accordance with the preferred embodiment of the present invention.

FIG. 12 illustrates a functional block diagram of a phase-locked-loop timing system 1200 in accordance with the preferred embodiment of the present invention. Block L represents the open-loop transfer function of the PLL circuit 1200. The open loop transfer function includes the voltage controlled oscillator ("VCO"), a compensation circuit, and an amplifier circuit among others. The PLL output signal 1208, designated as "y" in the equations that follow, represents the phase of the signal output of the VCO. It should be noted that signal y 1208 is used to drive the write transducer, and therefore, determines the phase of the signal written on the disc.

The read signal 1201, designated as "t" in the equations that follow, represents the phase of the timing bursts written on the disc. When the timing bursts are read by the read transducer, the phase of signal t 1201 is influenced by various disturbances. These disturbances are represented by a disturbance signal 1202, designated as "d" in the equations that follow.

The sum 1203 of signal t 1201 and signal d 1202 represents the phase of the signal generated in the read element as it travels over the timing bursts written on the disk. This signal is designated as signal "r" 1203 in the equations that follow. Signal r 1203 enters a summing junction, which represents the delay circuit. A delay signal 1204, designated as "p" in the equations that follow, represents the desired delay of the delay circuit. The sum 1205 of signal r 1203 and p 1204 is the reference input to the PLL loop's phase detector circuit and is designated as "u" 1205 in the equations that follow. The phase detector circuit determines the phase difference between signal u 1205 and the VCO output signal y 1208, and produces the phase error signal 1206, designated as "e" in the equations that follow.

The disturbance signal d 1202 is caused by spindle speed variation and various noise sources, such as media noise, electrical noise, etc. In order to insure track-to-track alignment of the timing bursts the phase variation caused by spindle speed variation should be accurately followed by the PLL. However, the phase variation caused by electrical noise and media noise should not be followed.

The frequency spectrum of the disturbance caused by spindle speed variation in a typical disc drive is typically between 50 Hz and a few KHz. On the other hand, the frequency spectrum of the disturbance caused by electrical noise and media noise is typically higher than a few MHz. Therefore, with a careful design of the PLL transfer function "L", adequate following of the disturbances caused by spindle speed variation can be achieved, as well as adequate attenuation of undesired high frequency noises.

Figure 13:
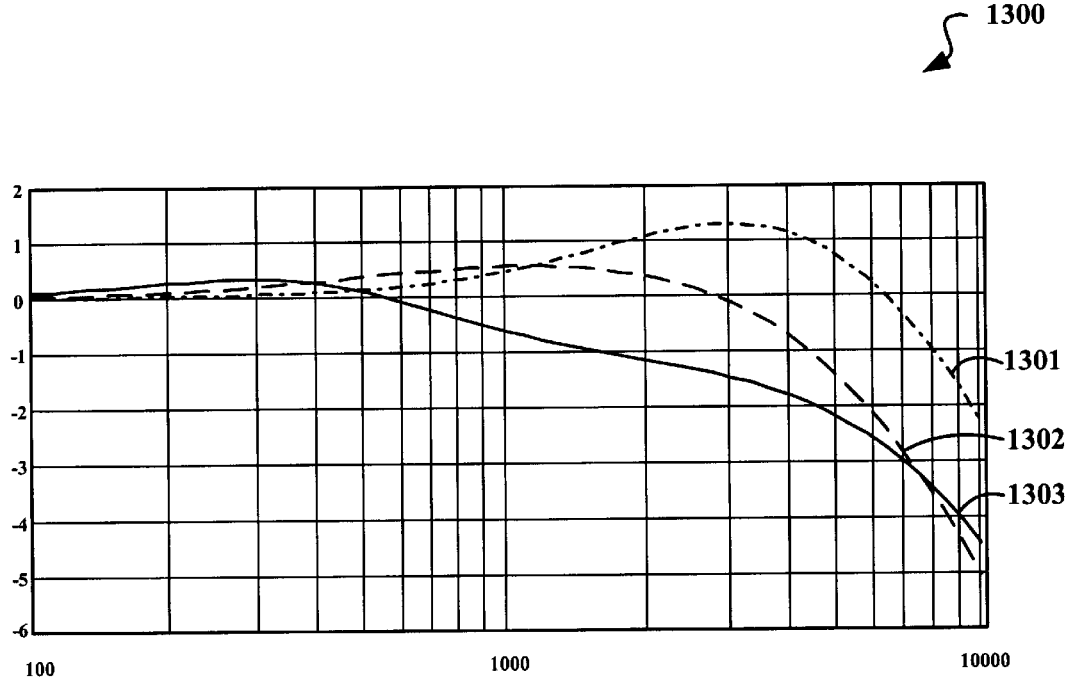
FIG. 13 illustrates the frequency response curve of a typical phase-lock-loop set-point transfer function in accordance with an embodiment of the present invention.

FIG. 13 illustrates the frequency response curves of a typical phase-lock-loop set-point transfer function in accordance with an embodiment of the present invention. As previously discussed, it is inevitable that each propagated timing burst has a small amount of timing error due to the various disturbances. During the propagation process the PLL attempts to follow these timing errors, and therefore, the timing errors influence the accuracy of the timing bursts written on the propagated servo tracks.

A typical PLL set-point transfer function frequency response 1301 is shown by in FIG. 13. The set point input of the PLL set-point transfer function is the phase of the reference signal r 1203 and the output is the phase of the VCO output signal y 1208. At low frequencies the gain of the PLL transfer function is approximately 1 or zero dB (as shown on the scale of FIG. 13). Therefore, written-in timing errors at low frequencies will be directly inherited by the propagated tracks.

Between 500 Hz and 5 KHz the gain of the typical PLL set-point transfer function frequency response 1301 is higher than 0 dB. Thus, if the phase error of the timing bursts being followed by the PLL has frequency components between 500 Hz and 5 KHz, the phase variation at the output of the PLL will be amplified. As a consequence, the timing bursts in the propagated track will have even larger written in errors than the track being followed. Therefore, the timing errors will grow unboundedly during the propagation process and will result in unacceptably large timing errors within a few hundred propagation steps.

An obvious solution would be to tune the PLL such that the gain of the input to output transfer function remains below 0 dB at all frequencies. Unfortunately, in most cases, such tuning would result in a very poor following of the low frequency phase variation caused by spindle speed variation. Poor following of the low frequency phase variation, in turn, causes excessive track-to-track timing error.

In most cases, however, it is possible to reduce the peaking of the PLL transfer function to less than 1 dB (as shown by the dashed lines 1301, 1302 in FIG. 13) by tuning the PLL transfer function. This is accomplished by appropriate selection of the PLL loop compensation. In general, large open loop phase and gain margins result in lower peaking of the closed loop transfer function. The various issues of tuning the PLL and selecting the desired compensation is well known to those skilled in the art of Phase Locked Loop design. Reducing the peaking of the PLL transfer function to less that 1 dB significantly reduces the amplification of timing errors, while maintaining both reasonable gain at low frequencies and adequate attenuation at high frequencies.

Figure 14:
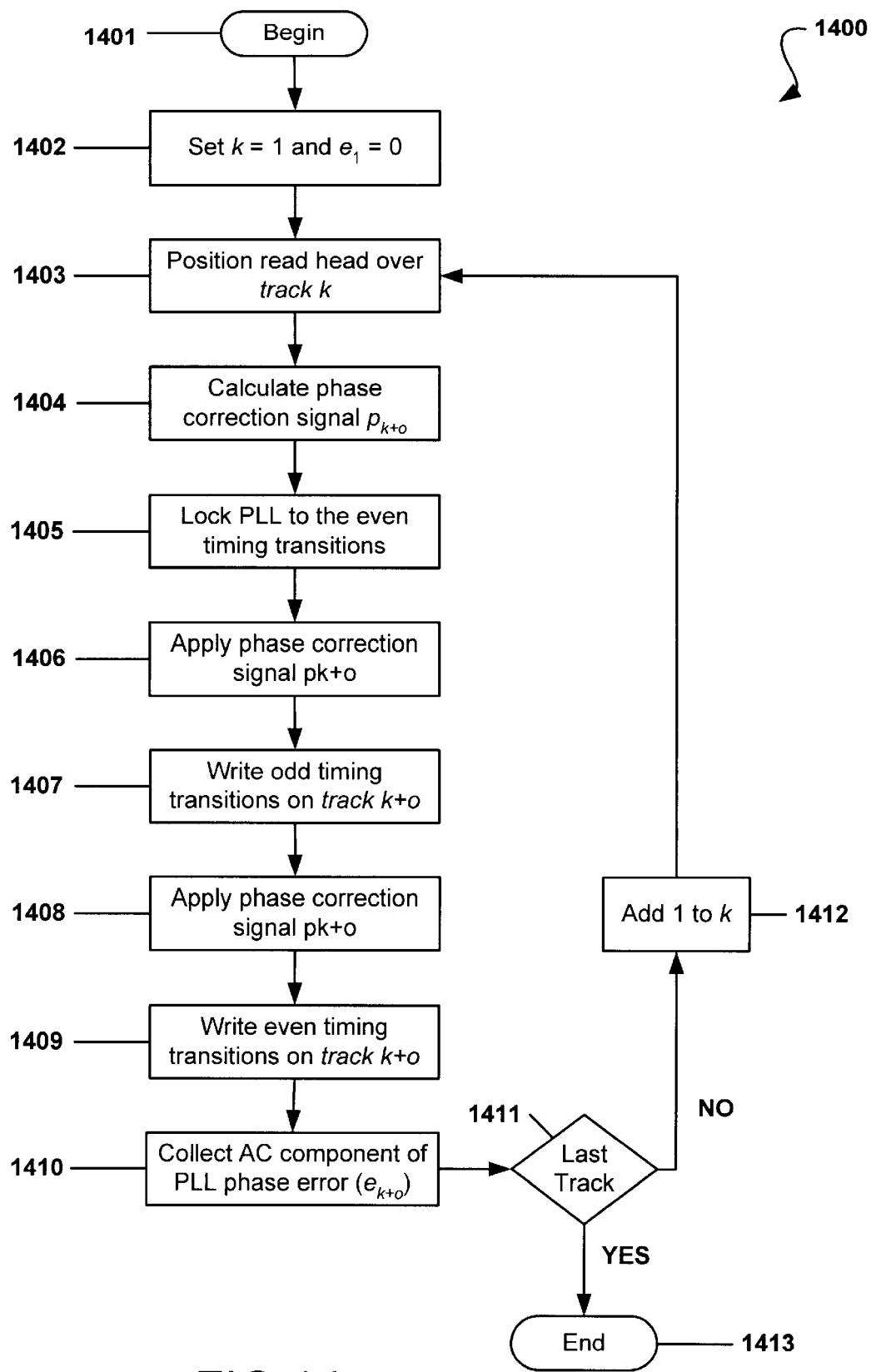
FIG. 14 is a flow chart of an operational process used to measure the timing error on each track present during timing burst propagation in accordance with the preferred embodiment of the present invention.

Although a careful tuning of the PLL can significantly reduce the amplification of errors during the propagation process, the slight amplification of certain frequency components can still result in unboundedly increasing timing errors. A new method called "Time Alignment Preservation" or TAP insures that timing errors will be continuously attenuated during the propagation process. FIG. 14 is a flow chart of an embodiment of the TAP process. FIG. 14 illustrates operational process 1400, which measures the timing error on each track present during timing bursts propagation in accordance with the preferred embodiment of the present invention.

The basic idea of the TAP method is to measure the timing error on each track and insert appropriate phase correction.

In the preferred embodiment, the phase correction is accomplished by dynamically adjusting the delay circuit. It should be noted that, in the discussion that follows, the subscripts of various signals refer to track numbers. For example, $t_k$ refers to the phase of the timing bursts written on track k.

Operational process 1400 is initiated with begin operation 1401. In the preferred embodiment, the manufacturer initiates operation 1401 during the disc drive manufacture process, when timing bursts are being written to the disc drive. Operational control is then passed to operation 1402.

Operation 1402 sets the value of k equal to 1 and the value of $e_1$ to zero. In the preferred embodiment, the value k is used to denote the track number among others. The value of $e_1$, on the other hand, is used to denote the phase error signal of the timing bursts written on track 1. Operational control is surrendered to operation 1403 after operation 1402 sets k=1 and $e_1$=0. Operation 1403 aligns the read element to track k. In the preferred embodiment, positioning information is gathered from the servo sectors and timing bursts previously written within track k. Operational control is then surrendered to operation 1404.

Operation 1404 calculates the phase correction signal $p_{k+o}$, where $p_{k+o}$ denotes the phase correction applied while track k+o is being written. In the preferred embodiment, the phase correction signal $p_{k+o}$ is calculated using the following equations and steps. It should be noted that other methods for calculating the phase correction signal are contemplated by the present invention.

First, $t_k$ is used to denote the phase of the timing marks written on track k. When track k+o is being written, the PLL attempts to follow $t_k$. Note that the output of the PLL (signal y 1208) is connected to the write transducer after appropriate amplification. Therefore, signal y directly determines the phase of the signal written on the propagated track. In other words, the phase of the timing bursts written on track k+o can be expressed as $t_{k+o}=Y_{k+o}$, where $y_{k+o}$ denotes the phase of the PLL output during the write revolution of track k+o. Examining FIG. 12, it is clear that the phase of the timing bursts written on track k+o can be expressed as follows:

$$t_{k+o} = y_{k+o} = (t_k + d_{k+o} + p_{k+o})\frac{L}{1+L} \quad (1)$$

where $d_{k+o}$ denotes the disturbances that occur while track k+o is being written, $p_{k+o}$ denotes the phase correction applied while track k+o is being written, and L denotes the setpoint transfer function of the PLL.

In a typical disc drive the disturbance d is relatively small, and does not cause significant t propagation error in a single propagation step. Assuming that the phase correction p=0, then written in errors will be amplified by the PLL in each propagation step. After several propagation steps the written-in error t becomes significantly larger than d. Therefore, for the purpose of studying the stability of the propagation process d can be neglected, and $t_{k+o}$ can be approximated as:

$$t_{k+o} \approx (t_k + p_{k+o})\frac{L}{1+L} \quad (2)$$

Note that the PLL phase error is recorded during each write revolution. Thus, the written in timing error of track k can be computed from the PLL phase error recorded during the write revolution of track k as follows:

$$t_k = Y_k = e_k L \quad (3)$$

where $e_k$ denotes the PLL phase error recorded during the write revolution of track k. The phase correction signal $P_k$ is then chosen as $$P_k = -KLe_k = -Kt_k \qquad (4)$$

where K is an appropriately chosen positive constant. Substituting Eq. 4 into Eq. 2, the phase of the timing marks written on track k+o can be expressed as follows:

$$t_{k+o} \approx t_k(1-K)\frac{L}{1+L} \qquad (5)$$

This recursive equation is stable if and only if the following inequality holds at all frequencies:

$$\left|(1-K)\frac{L}{1+L}\right| < 1 \qquad (6)$$

Thus, the timing propagation process is stable if the constant K is chosen as $$K > 1 - \max_\omega \left|\frac{1+L(\omega)}{L(\omega)}\right| \qquad (7)$$

where $\omega$ denotes the frequency.

It should be noted that the constant K can be replaced by a frequency dependent transfer function $K(\omega)$, which allows more precise control of the stability of the propagation process at various frequencies. In this case the stability condition can be expressed as:

$$|1 - K(\omega)| > \max_\omega \left|\frac{1+L(\omega)}{L(\omega)}\right| \qquad (8)$$

As previously mentioned, this is the preferred embodiment for calculating $P_{k+o}$. Other methods may be used while remaining within the scope of the present invention. After the phase correction signal is calculated, operational control is surrendered to operation 1405.

Operation 1405 locks, or synchronizes, the PLL to the even timing bursts. In other words, the PLL is set such that when the read element is over an even timing transition, the timing controller circuit disables the write head amplifier circuit. Synchronizing to the previously written timing transitions aids in ensuring that the propagated timing transitions will be properly aligned with the previously written timing transitions. Operational control is then surrendered to operation 1406.

Operation 1406 applies the phase correction signal $p_{k+o}$. The phase correction signal $p_{k+o}$ ensures that timing errors are continuously attenuated during the propagation process, thereby reducing the effect of the timing errors on the propagation process. In the preferred embodiment, the phase correction signal $p_{k+o}$ ensures that the write element is not activated for writing a timing transition until the write element is aligned with a corresponding timing transition on track k. Operational control is surrendered to operation 1407 after the phase correction signal $p_{k+o}$ is applied.

Operation 1407 writes odd timing transitions on track k+o, where o denotes the radial offset of the read and write elements. In the preferred embodiment, the timing controller circuit enables the write head amplifier circuit and an odd timing transition is written to the disc. While the odd timing transition is being written, the PLL is coasting. In other words, the PLL is constrained to function from internal phase and frequency references when the write element is writing odd transitions. Operational control is then surrendered to operation 1408.

Operation 1408 locks, or synchronizes, the PLL to the odd timing marks. In other words, the PLL is set such that when the read element is over an odd timing transition, the timing controller circuit disables the write head amplifier circuit. Synchronizing to the previously written timing transitions aids in ensuring that the propagated timing transitions will be properly aligned with the previously written timing transitions. Operational control is then surrendered to operation 1409.

Operation 1409 writes even timing transitions on track k+o, where o denotes the radial offset of the read and write elements. In the preferred embodiment, the timing controller circuit enables the write head amplifier circuit and an even timing transition is written to the disc. While the even timing transition is being written, the PLL is coasting. In other words, the PLL is constrained to function from internal phase and frequency references when the write element is writing even transitions. Operational control is then surrendered to operation 1410.

Operation 1410 measures and collects the AC component of the PLL phase error during the write revolution, and denotes the PLL phase error as $e_{k+o}$. In the preferred embodiment, the PLL phase error is the phase difference between signal u 1205 (i.e., the sum of signal generated by the read element t 1201, various signal disturbances d 1202, and the desired delay of the delay circuit p 1204) and the PLL output signal y 1208 (i.e., the phase of the signal output by the VCO). It should be noted that signal y 1208 is used to drive the write transducer, and therefore, determines the phase of the signal written on the disc. The PLL phase error signal is then input to the PLL transfer function. Operational control is then surrendered to determination operation 1411.

Determination operation 1411 ascertains whether the current track is the last track to have timing bursts written. If the current track is the last track to have timing bursts written, operational control branches YES and operation 1413 terminates operational process 1400. If the current track is not the last track to have timing bursts written, then operational control branches NO and operation 1412 assumes control. Operation 1412 adds one to the value of k and surrenders control to operation 1403. Operations 1403 through 1412 are repeated until timing bursts are written to the desired tracks, at which point operation 1413 terminates operational process 1400.

In summary, embodiments of the present invention may be viewed as a method for writing timing bursts (such as 401) and servo sectors (such as 402) to tracks (such as 120) on a data storage media (such as 108) that contains a plurality of guide pattern tracks (such as 400) that already contain timing bursts and servo sectors, and a plurality of target tracks that contain no timing bursts or servo sectors. The method uses a controller (such as 500) and a read/write head (such as 118) that has a read element (such as 602) and a write element (such as 601) that is radially offset from the read element such that when the write element is aligned over a target track, the read element is aligned over a guide pattern track (such as 400) that already contains timing bursts (such as 401) and servo sectors (such as 402). The controller (such as 500) is synchronized to the timing bursts and servo sectors on the guide pattern track and timing bursts and servo sectors are written to the target track. The method is repeated for additional target tracks until all guide pattern tracks have been used. The method then aligns the write element over further target tracks and, by synchronizing the controller to the timing burst and servo sectors on former target tracks that now have timing bursts and servo sectors written to them, writes timing bursts and servo sectors to all the remaining target tracks.

Embodiments of the present invention may also be viewed as a method to correct for the effect of changes in circumference between tracks by circumferentially aligning the timing transitions within a timing burst (such as 401) and servo sectors (such as 402) written to a target track (such as 120) with the timing transitions and servo sectors used to synchronize the controller (such as 500). Timing information, such as timing bursts and servo sectors, are written to a target track such that the start of the timing information is aligned with the start of the timing information from the track used for synchronization. A portion of the timing information on the target track is erased by a write element (such as 601) and a calibration timing transition is written to the track using a nominal timing delay. A first time interval between the preceding timing information and the calibration timing transition is measured as is a second time interval between the calibration timing transition and the following timing information. The first and second time intervals are compared and the time delay is adjusted. Timing information is rewritten to the target track using the adjusted time delay and the process is repeated until the timing information on the target track is circumferentially aligned to the timing information on the synchronizing track.

Embodiments of the present invention may be further viewed as a method for attenuating timing errors during timing burst (such as 401) propagation on a data storage media (such as 108) having a plurality of tracks (such as 120) in a data storage device (such as 100) having a controller (such as 500) and a read/write head (such as 118). The method includes setting a variable, k, indicative of a track number, to one and a track phase error variable $e_k$ to zero for track k. The read element (such as 602) is positioned over track k. A phase correction signal, denoted by variable $p_{k+o}$, for track k+o is calculated, where o refers to an offset between the read element (such as 602) and a write element (such as 601) on the read/write head (such as 118) such that when the read element is positioned over track k, the write element is positioned over track k+o. The controller synchronizes a phase locked loop circuit to an even timing transition on the track being read by the read element. The controller uses the phase correction signal to position the read/write head and writes an odd timing transition to track k+o. The controller synchronizes the phase locked loop circuit to an odd timing transition on the track being read by the read element. The track phase error $e_{k+o}$ is measured for the track k+o by measuring an AC component of the phase locked loop circuit's phase error.

Embodiments of the present invention may be further viewed as an apparatus for propagating a timing burst to a track (such as 120) on a data storage media (such as 108) in a data storage device (such as 100) having a read/write head (such as 118) in order to circumferentially position the read/write head relative to the surface of the data storage media. The apparatus comprises a controller (such as 500) having a time delay value and being operable to read data from and store data to the data storage media. The apparatus further comprises a means for synchronizing the controller to a previously written timing burst (such as 401) on the data storage media and for writing the timing burst to the track.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo track writing application while maintaining substantially the same functionality without departing from the scope and spirit of the present invention. In addition, although the preferred embodiment described herein is directed to self-propagating the writing of timing bursts to servo tracks on a magnetic storage media, it will be appreciated by those skilled in the art that the teachings of the present invention can be applied to other systems, like optical storage media systems or storage media systems using physical marks, without departing from the scope and spirit of the present invention.

What is claimed is:

1. A method for writing timing information on a data storage media:
    (a) determining an offset distance between a read element and a write element to position the write element to a first target track;
    (b) reading a timing burst within a guide pattern with the read element;
    (c) synchronizing to an even timing transition within the timing burst;
    (d) writing an odd timing transition with the write element to the first target track.

2. The method of claim 1 further comprising:
    (e) synchronizing to an odd timing transition within the timing burst; and
    (f) writing an even timing transition with the write element to the first target track.

3. The method of claim 2 further comprising:
    (i) positioning the write element over another target track;
    (j) reading with the read element the timing burst written to a track associated with the offset distance between the read element and the write element;
    (j) synchronizing with the read element to the even timing transition;
    (k) writing an odd timing transition with the write element to the other target track.

4. The method of claim 3 further comprising:
    (l) synchronizing with the read element to the odd timing transition;
    (m) writing an even timing transition with the write element to the other target track.

5. The method of claim 4 further comprising repeating steps(i) through (k) until timing information is written to a desired number of tracks.

6. The method of claim 5 further comprising repeating steps (a) at an intermediate track within the desired number of tracks.

7. A method for circumferentially aligning a first timing transition in a timing burst of a first track to a second timing transition in a timing burst of a second track on a data storage media in a data storage device having a controller with a time delay and a read/write head, the read/write head comprising a read element and a write element, the timing burst in the first track and the timing burst in the second track having one or more even timing transitions and one or more odd timing transitions, the controller being operable to position the read/write head and operable to retrieve information from and store information to the data storage media, the method comprising the steps of:

(a) setting the time delay to a nominal value;

(b) aligning the write element over the timing burst of the first track;

(c) erasing one or more timing transitions of the timing burst of the first track to obtain an erased zone;

(d) synchronizing the controller to the second timing transition of the timing burst of the second track;

(e) writing a calibration timing transition within the erased zone with the write element;

(f) measuring a first time interval between a first trigger point and the calibration timing transition;

(g) measuring a second time interval between the calibration timing transition and a second trigger point;

(h) comparing the first time interval to the second time interval; and (i) adjusting the time delay such that the calibration timing transition is circumferentially aligned with a corresponding second timing transition of the second track.

8. The method of claim 7 wherein aligning step (b) further comprises steps of:

(b)(1) calculating an offset distance;

(b)(2) positioning the read element over the second track, the second track's location being equal to the first track's location minus the offset distance; and (b)(3) reading timing information from the second track.

9. The method of claim 7 wherein erasing step (c) further comprises steps of:

(c)(1) transmitting a null signal to the write element; and (c)(2) enabling the write element with an enable signal from the controller.

10. The method of claim 7 wherein the synchronization step (d) further comprises:

(d)(1) reading an even timing transition of the timing burst within the second track; and (d)(2) coasting over a second odd timing transition of the timing burst within the second track while writing a first odd timing transition of the timing burst within the first track.

11. The method of claim 7 wherein the synchronization step (d) further comprises:

(d)(1) reading an odd timing transition of the timing burst within the second track; and (d)(2) coasting over a second even timing transition of the timing burst within the second track while writing a first even timing transition of the timing burst within the first track.

12. The method of claim 7 wherein the measuring step (f) further comprises steps of:

(f)(1) initiating a timer when the write element reaches a timing transition that is immediately before the erased zone of the timing burst; and (f)(2) terminating the timer when the write element reaches the calibration timing transition.

13. The method of claim 7 wherein the measuring step (g) further comprises steps of:

(g)(1) initiating a timer when the write element reaches the calibration timing transition; and (g)(1) terminating the timer when the write element reaches a timing transition that is immediately after the erased zone of the timing burst.

14. The method of claim 7 wherein adjusting step (i) further comprises:

(i)(1) increasing the time delay if the first time interval is less than the second time interval; and (i)(2) decreasing the time delay if the first time interval is greater than the second time interval.

15. The method of claim 7 wherein the read element and the write element are radially offset relative to a surface of the data storage media by an offset distance, the offset distance being greater than the width of the write element and greater than the width of the read element.

16. A method for attenuating timing errors during timing burst propagation on a data storage media having a plurality of tracks in a data storage device having a controller and a read/write head with a read element and a write element, the controller having a phase locked loop circuit and being operable to position the read/write head and operable to retrieve information from and store information to the data storage media, the method comprising steps of:

(a) setting k equal to one, where k refers to the track number;

(b) setting $e_k$ equal to zero, where $e_k$ refers to the phase locked loop circuit's phase error for track k;

(c) positioning the read element over track k;

(d) calculating $P_{k+o}$, where $p_{k+o}$ refers to a phase correction signal of track(k+o) and o refers to an offset distance between the read element and the write element;

(e) synchronizing the phase locked loop circuit to an even timing transition being read by the read element;

(f) applying $p_{k+o}$ to the controller while the controller positions the read/write head;

(g) writing an odd timing transition on track(k+o);

(h) synchronizing the phase locked loop circuit to an odd timing transition being read by the read element; and (i) measuring $e_{k+o}$, where $e_{k+o}$ refers to an AC component of the phase locked loop circuit's phase error.

17. The method of claim 16 further comprising steps of:

(j) determining whether more timing bursts are to be propagated;

(k) adding one to k if more timing bursts are to be propagate; and (l) repeating setting step (b) through adding step (k).

18. An apparatus for propagating a timing burst to a target track on a data storage media comprising:

a phrase locked loop controller adapted to read data from and store data storage media; and means for synchronizing the controller to a previously written timing burst on the data storage media and for writing the timing burst to the target track.

19. The apparatus of claim 18 wherein the timing burst and the previously written timing burst each contain an odd timing transition and an even timing transition.

20. The apparatus of claim 18 wherein the time controller comprises an adjustable time delay to circumferentially align the timing burst with the previously written timing burst.

21. The apparatus of claim 18 wherein the means for synchronizing is characterized by a read/write head comprising a read element and a write element, the read element being separated from the write element by an offset distance greater than a width of the read element and greater than a width of the write element.

22. The apparatus of claim 21 wherein the offset distance spans one or more tracks of the data storage media.

23. The apparatus of claim 18 wherein the previously written timing burst is located in a guide pattern written on the data storage media.

24. The apparatus of claim 20 wherein the means for synchronizing is characterized by calculating the time delay more than once as the timing bursts are propagated on the data storage media.

25. The method of claim 18 wherein the means for synchronizing is characterized by attenuating timing burst propagation errors by computing and applying a correction signal to eliminate a phase error of the phase locked loop circuit.

* * * * *